United States Patent
Kuroki et al.

(10) Patent No.: US 11,643,536 B2
(45) Date of Patent: May 9, 2023

(54) THERMOPLASTIC RESIN COMPOSITION AND FORMED ARTICLE FORMED BY USING THERMOPLASTIC RESIN COMPOSITION

(71) Applicant: TBM CO., LTD., Tokyo (JP)

(72) Inventors: Shigeki Kuroki, Tokyo (JP); Gouki Sasakawa, Tokyo (JP)

(73) Assignee: TBM CO., LTD., Tokyo (JP)

( * ) Notice: Subject to any disclaimer, the term of this patent is extended or adjusted under 35 U.S.C. 154(b) by 398 days.

(21) Appl. No.: 16/648,496

(22) PCT Filed: Sep. 19, 2018

(86) PCT No.: PCT/JP2018/034606
§ 371 (c)(1),
(2) Date: Mar. 18, 2020

(87) PCT Pub. No.: WO2019/059222
PCT Pub. Date: Mar. 28, 2019

(65) Prior Publication Data
US 2020/0224016 A1 Jul. 16, 2020

(30) Foreign Application Priority Data
Sep. 21, 2017 (JP) .............................. JP2017-181511

(51) Int. Cl.
*C08L 23/12* (2006.01)
*C08L 23/10* (2006.01)
*C08K 3/26* (2006.01)

(52) U.S. Cl.
CPC .............. *C08L 23/12* (2013.01); *C08K 3/26* (2013.01); *C08K 2003/265* (2013.01); *C08K 2201/003* (2013.01); *C08L 2205/025* (2013.01)

(58) Field of Classification Search
CPC .... C08L 23/10; C08L 23/12; C08L 2205/025; C08L 2203/14; C08K 2003/265
See application file for complete search history.

(56) References Cited

U.S. PATENT DOCUMENTS

| | | | | |
|---|---|---|---|---|
| 5,254,393 A * | 10/1993 | Murschall | ............... | B32B 27/16 264/289.3 |
| 5,489,471 A | 2/1996 | Inoue et al. | | |
| 5,554,668 A * | 9/1996 | Scheve | ..................... | C08F 8/00 522/915 |
| 7,144,925 B2 * | 12/2006 | Burgun | .................. | C08J 9/0066 521/134 |
| 7,423,071 B2 * | 9/2008 | Mogami | ............... | C08F 255/00 521/142 |
| 8,080,624 B2 * | 12/2011 | Ito | ......................... | C08F 210/06 526/943 |
| 8,163,845 B2 * | 4/2012 | Busch | ..................... | C08L 23/10 525/240 |
| 8,481,636 B2 * | 7/2013 | Kim | ........................ | C08L 23/10 524/433 |
| 8,552,116 B2 * | 10/2013 | Okura | ..................... | C08L 23/04 525/193 |
| 9,290,600 B2 * | 3/2016 | Prokschi | ..................... | C08J 9/00 |
| 9,376,549 B2 * | 6/2016 | Klimke | ..................... | C08K 5/11 |
| 9,505,894 B2 * | 11/2016 | Hotta | .................. | B29C 45/0001 |
| 10,059,037 B2 * | 8/2018 | Li | ....................... | B29C 48/0018 |
| 10,179,851 B2 * | 1/2019 | Prokschi | .................... | C08J 5/18 |
| 10,464,251 B2 * | 11/2019 | Asuka | ..................... | B29C 51/00 |
| 10,676,604 B2 * | 6/2020 | Reichelt | ................ | C08F 299/00 |
| 10,882,968 B2 * | 1/2021 | Lin | ........................ | C08J 9/0028 |
| 10,947,373 B2 * | 3/2021 | Katsuno | .............. | H01M 50/417 |
| 2009/0208676 A1 | 8/2009 | Tanaka et al. | | |
| 2014/0100328 A1 | 4/2014 | Yuichiro et al. | | |
| 2015/0353695 A1 | 12/2015 | Yuichiro et al. | | |
| 2017/0240733 A1 * | 8/2017 | Gitsas | ..................... | C08L 23/10 |
| 2018/0304520 A1 * | 10/2018 | Asuka | ...................... | C08K 7/06 |

FOREIGN PATENT DOCUMENTS

| | | | | | |
|---|---|---|---|---|---|
| CN | 105330960 A | * | 2/2016 | ............. | C08L 23/12 |
| EP | 570221 A2 | * | 11/1993 | ............... | C08J 9/12 |
| EP | 0888866 B1 | | 11/2002 | | |
| EP | 2818511 A1 | | 12/2014 | | |
| GB | 2483335 A | | 3/2012 | | |
| JP | H10219042 A | | 8/1998 | | |
| JP | 2001071378 A | | 3/2001 | | |
| JP | 2001-226510 A | * | 8/2001 | ............... | C08J 9/04 |
| JP | 2001226510 A1 | | 8/2001 | | |
| JP | 2004-082484 A | * | 3/2004 | ............ | B29C 47/00 |
| JP | 2004160689 A | | 6/2004 | | |
| JP | 2005068362 A | | 3/2005 | | |

(Continued)

OTHER PUBLICATIONS

JP 2017-2229 A (Jan. 5, 2017) Asuka, Kazuo et al.; machine translation. (Year: 2017).*
JP 2001-226510 A (Aug. 21, 2001); machine translation. (Year: 2001).*
CN 105330960 A (Feb. 17, 2016); machine translation. (Year: 2016).*
KRO Office Action for corresponding KR Patent Application No. KR10-2020-7010998; dated Sep. 24, 2020.

(Continued)

*Primary Examiner* — Rip A Lee
(74) *Attorney, Agent, or Firm* — Cantor Colburn LLP

(57) ABSTRACT

Provided is a sheet not generating feeding failure in a device having a heat setting process even when a large amount of an inorganic filler is included and a thermoplastic resin composition for forming the sheet. The thermoplastic resin composition may include at least a thermoplastic resin and an inorganic filler, in which the thermoplastic resin includes polypropylene having no long chain branch (B) and polypropylene having a long chain branching structure (A) in a mass ratio of 80:20 to 98:2.

12 Claims, 2 Drawing Sheets

(56) References Cited

FOREIGN PATENT DOCUMENTS

| | | | |
|---|---|---|---|
| JP | 2005336419 A | 12/2005 | |
| JP | 2006241356 A | 9/2006 | |
| JP | 2013010931 A | 1/2013 | |
| JP | 2015078276 A | 4/2015 | |
| JP | 2017-2229 A * | 1/2017 | ............... C08J 5/18 |
| RU | 2476632 C1 | 2/2013 | |
| WO | 2007132826 A1 | 11/2007 | |
| WO | 2014109267 A1 | 7/2014 | |
| WO | 2017061530 A1 | 4/2017 | |

OTHER PUBLICATIONS

RUO Office Action for corresponding RU Patent Application No. 2020112964; dated Oct. 14, 2020.
International Search Report corresponding to Application No. PCT/JP2018/034606 dated Dec. 4, 2018.

* cited by examiner

THERMOPLASTIC RESIN COMPOSITION AND FORMED ARTICLE FORMED BY USING THERMOPLASTIC RESIN COMPOSITION

This is the U.S. national stage of application No. PCT/JP2018/034606, filed on Sep. 19, 2018. Priority under 35 U.S.C. § 119(a) and 35 U.S.C. § 365(b) is claimed from Japanese Application No. 2017-181511 filed Sep. 21, 2017, the disclosure of which is also incorporated herein by reference.

FIELD

The present invention relates to a thermoplastic resin composition and a formed article formed by using the thermoplastic resin composition.

BACKGROUND

Conventionally, a sheet-like product to be served as a synthetic paper has been formed from a thermoplastic resin composition made by mixing a thermoplastic resin and an inorganic filler (hereinafter, may be simply referred to as a "sheet aspect"). However, with respect to the sheet-like product produced from the thermoplastic resin composition in which the inorganic filler is blended in a high concentration, the use of the sheet-like product is limited in a narrow range due to the problem of quality such as strength and processability of the sheet-like product. Therefore, for such a sheet formed from the resin composition in which the inorganic filler is blended in a high concentration, various studies of the technique for obtaining the sheet having higher quality have been carried out.

For example, in Patent Literature 1, a polyethylene-based synthetic paper including high content inorganic mineral powder and considering an environment property has been developed by mixing, extruding, and pelletizing a composition including about 43% by weight to about 18% by weight of polyethylene, 56% by weight to 80% by weight of the inorganic mineral powder, and about 1% by weight to about 2% by weight of additives, and further forming a parison and carrying out blow molding to form a sheet-like product and, at the same time, stretching the sheet-like product with tension rollers to stretch in a biaxial directions.

In Patent Literature 2, providing a resin sheet reducing mixing of contamination, having a uniform thickness, having an apparent specific gravity similar to paper and having excellent merchantability, and blending an inorganic filler in a high concentration has been developed by preparing inorganic substance powder to be blended having a predetermined average particle diameter range and containing no coarse particles, using an extruder equipped with twin screws for kneading the composition to knead the composition by applying high shear stress, extrusion-forming the composition to form a sheet-like product using a T die method, and adjusting the sheet after stretching to have a desired apparent specific gravity by controlling the stretching ratio in both longitudinal direction and transverse direction within a specified value.

In Patent Literature 3, providing a resin sheet for processing that has a specific gravity within a predetermined range and in which a processing material can be efficiently applied or vacuum-evaporated to the resin sheet surface in a low cost and the laminated layers strongly adhere by setting water absorbency within a predetermined range has been developed by controlling the degree of stretching in such a resin sheet for processing blending the inorganic filler in a high concentration.

The techniques described in Patent Literatures 1 to 3 are intended to improve, for example, the strength and smoothness of the obtained sheet mainly by adjusting physical properties or the like at a processing process to the sheet in the case where the inorganic filler is blended to the thermoplastic resin in a high concentration.

Different from the sheet aspect as described above, another aspect (hereinafter, may be referred to as a "coating aspect") of obtaining a sheet-like composite material by forming a thin film of a thermoplastic resin composition into which the inorganic filler is blended, that is, a coating film lacking a self-supporting property on the surface of various resin films, metal foils, papers, or laminated products thereof serving as substrates has been conventionally known. The coating aspect is an aspect that provides properties such as printability, opaqueness, and surface texture modification to the substrate surface by the coating film of the inorganic filler-blended thermoplastic resin composition.

As the thermoplastic resin composition used in such a coating aspect, a thermoplastic resin composition in which 1 part by weight to 900 parts by weight of a filler is included relative to 100 parts by weight of a thermoplastic resin having a long chain branching index of 0.35 to 0.70 as the main components or a thermoplastic resin composition in which the mixing ratio of polypropylene and low density polyethylene having a long chain branch is determined to be 95:5 to 70:30 in a weight ratio and 1 part by weight to 900 parts by weight of a filler is included relative to 100 parts by weight of the thermoplastic resin having a melt tension of 0.1 g to 3.0 g and a melt flow rate (230° C.) of 10 g/10 minutes to 50 g/10 minutes has been developed in Patent Literature 4. In the coating aspect, melt coating treatment is carried out at a relatively high temperature so as to generate the surface oxidation of the resin for improving adhesion between the substrate and the inorganic filler-blended thermoplastic resin composition. However, the melt coating of the thermoplastic resin composition in which the inorganic filler is blended in a high concentration at high temperature causes difficulty in forming due to foaming occurrence and generates troubles of staining the die lip of a forming machine and generating streaks on the product surface. In order to solve these problems, Patent Literature 4 has tried to enable the coating to be carried out at low temperature by improving the drawdown of the resin composition using the above-described resin composition.

CITATION LIST

Patent Literature

Patent Literature 1: Japanese Patent Application Laid-open No. 2001-71378
Patent Literature 2: Japanese Patent Application Laid-open No. 2013-10931
Patent Literature 3: WO 2014/109267 Pamphlet
Patent Literature 4: Japanese Patent Application Laid-open No. H10-219042

SUMMARY

Technical Problem

However, in the sheet aspect of the thermoplastic resin composition as described above, a situation where the feed of a sheet is not smoothly carried out in a device having a heat setting process such as a laser printer has been generated even when the uniformity and strength of the sheet are tried to be improved to some extent by adjusting the processing conditions at the production described in the Patent Literatures 1 to 3 in the case where the sheet includes a large amount of the inorganic filler.

In a laser printer, a temperature of about 180° C. to about 200° C. is generally used as a toner fixing temperature. However, in the case where the thermoplastic resin composition including a large amount of the inorganic filler is constituted of the resin having a melting point lower than the fixing temperature such as general-purpose polyethylene and polypropylene as the substrate, troubles such as melting of the substrate in the device may occur when the feed of the sheet in the device is not smoothly carried out even if the substrate actually senses the temperature extremely short period of time. The cause of the generation of the above-described feeding failure is assumed to be the generation of an elongation due to partial heating of the sheet.

As the thermoplastic resin composition used for the coating aspect, improvement in flowability in extrusion laminating at low temperature and laminate adhesion has been developed by using, for example, polyethylene having a long chain branching index of 0.35 to 0.70 or a mixture having a mixing ratio of polypropylene and low density polyethylene having a long chain branch of 95:5 to 70:30 in a weight ratio as the resin component described in Patent Literature 4. Such a composition may be considered to be applied for the sheet aspect. In the composition using the polyethylene having the long chain branching structure as described in Patent Literature 4 alone or the like as the thermoplastic resin, even use of the composition putting emphasis on low temperature formability cannot solve the problem in that the feed of the sheet is not smoothly carried out in the device having a heat setting process such as a laser printer in the sheet aspect as described above.

The present invention has been made in view of the above actual situations. An object of the present invention is to provide a thermoplastic resin composition that can form a sheet not generating feeding failure in a device having a heat setting process even when the large amount of an inorganic filler is included and a formed article such as a sheet formed by using the thermoplastic resin composition. Another object of the present invention is to provide a thermoplastic resin composition having an excellent drawdown property and an excellent resin extension property at the time of heat melting even when a large amount of the inorganic filler is included and capable of forming to various forms with excellent properties and a formed article such as a sheet formed by using the thermoplastic resin composition. Another object of the present invention is to provide a thermoplastic resin composition having excellent heat resistance and flame retardancy and a formed article such as a sheet formed by using the thermoplastic resin composition.

Solution to Problem

As a result of intensive study for solving the above-described problems, the inventors of the present invention have found that, with respect to the thermoplastic resin composition including the thermoplastic resin and the inorganic filler, the feeding property of the sheet in a device having a heat setting process such as a laser printer has high correlation with enhancement in stretchability of the sheet formed from the thermoplastic resin composition in tensile tests at 170° C. and 180° C. Based on this finding, the inventors of the present invention have further extensively studied with a central focus on the evaluation of the tensile tests at the above-described temperature range with respect to the sheets of the thermoplastic resin compositions made by combining various thermoplastic resins and inorganic fillers. As a result, the inventors of the present invention have found that the shape of a resin product can be maintained even at the temperature range equal to or higher than the melting point of the macromolecule when the flowability of a macromolecule can be reduced. As a composition reducing such flowability without deteriorating the formability and processability, the inventors of the present invention have recalled the blend of polypropylene having no long chain branch (B) with polypropylene having a long chain branching structure (A). The blend of these polypropylenes in a specific ratio allows a sheet not generating feeding failure in a device having a heat setting process to be obtained even when a large amount of the inorganic filler is included. The inventors of the present invention have also found that such a thermoplastic resin composition has the excellent drawdown property at heat melting and the excellent resin extension property even when a large amount of the inorganic filler is included and can be formed to a sheet and various forms other than the sheet with excellent properties and the obtained formed article has excellent heat resistance and flame retardancy. Consequently, the present invention has been attained.

Namely, the present invention solving the above-described problems includes a thermoplastic resin composition comprising: at least a thermoplastic resin and an inorganic filler, in which the thermoplastic resin comprises polypropylene having no long chain branch (B) and polypropylene having a long chain branching structure (A) in a mass ratio of 80:20 to 98:2.

As one aspect of the thermoplastic resin composition according to the present invention, the thermoplastic resin composition, in which a blend ratio of the thermoplastic resin and the inorganic filler in the thermoplastic resin composition is 50:50 to 10:90 in a mass ratio is represented.

As another aspect of the thermoplastic resin composition according to the present invention, the thermoplastic resin composition in which the polypropylene having a long chain branching structure (A) is polypropylene having a long chain branching structure in which an isotactic triad fraction (mm) measured by $^{13}$C-NMR is 90% or more is represented.

As another aspect of the thermoplastic resin composition according to the present invention, the thermoplastic resin composition in which the polypropylene having a long chain branching structure (A) is polypropylene having a long chain branching structure having a melt flow rate (230° C.) of 1.0 g/10 minutes to 10.0 g/10 minutes and a melt tension (230° C.) of 3.5 g to 30.0 g is represented.

As another aspect of the thermoplastic resin composition according to the present invention, the thermoplastic resin composition in which the polypropylene having no long chain branching structure (B) is polypropylene having a melt flow rate (230° C.) of 0.3 g/10 minutes to 50.0 g/10 minutes is represented.

As further another aspect of the thermoplastic resin composition according to the present invention, the thermoplastic resin composition in which the inorganic filler is an inorganic filler having an average particle diameter of 0.1 μm or more and 50.0 μm or less is represented.

As further another aspect of the thermoplastic resin composition according to the present invention, the thermoplastic resin composition in which the inorganic filler is calcium carbonate is represented.

As another aspect of the thermoplastic resin composition according to the present invention, the thermoplastic resin composition in which the inorganic filler is heavy calcium carbonate is represented.

Furthermore, the present invention solving the above-described problems includes a formed article made of the above-described thermoplastic resin composition.

As another aspect of the formed article according to the present invention, the formed article that is a sheet is represented.

As another aspect of the formed article according to the present invention, the formed article that is a container body is represented.

As further another aspect of the formed article according to the present invention, the formed article having a thickness of 50 μm or more and 700 μm or less is represented.

Advantageous Effects of Invention

According to the present invention, the thermoplastic resin composition that can form a sheet not generating the feeding failure in a device having a heat setting process even when the large amount of an inorganic filler is included and a formed article such as a sheet formed by using the thermoplastic resin composition can be provided. According to the present invention, the thermoplastic resin composition having an excellent drawdown property and an excellent resin extension property at the time of heat melting even when a large amount of the inorganic filler is included and capable of forming to various forms with excellent properties and a formed article such as a sheet formed by using the thermoplastic resin composition can be provided. In the present invention, the thermoplastic resin composition having excellent heat resistance and flame retardancy and a formed article such as a sheet formed by using the thermoplastic resin composition can be further provided.

DESCRIPTION OF EMBODIMENTS

Figure 1:
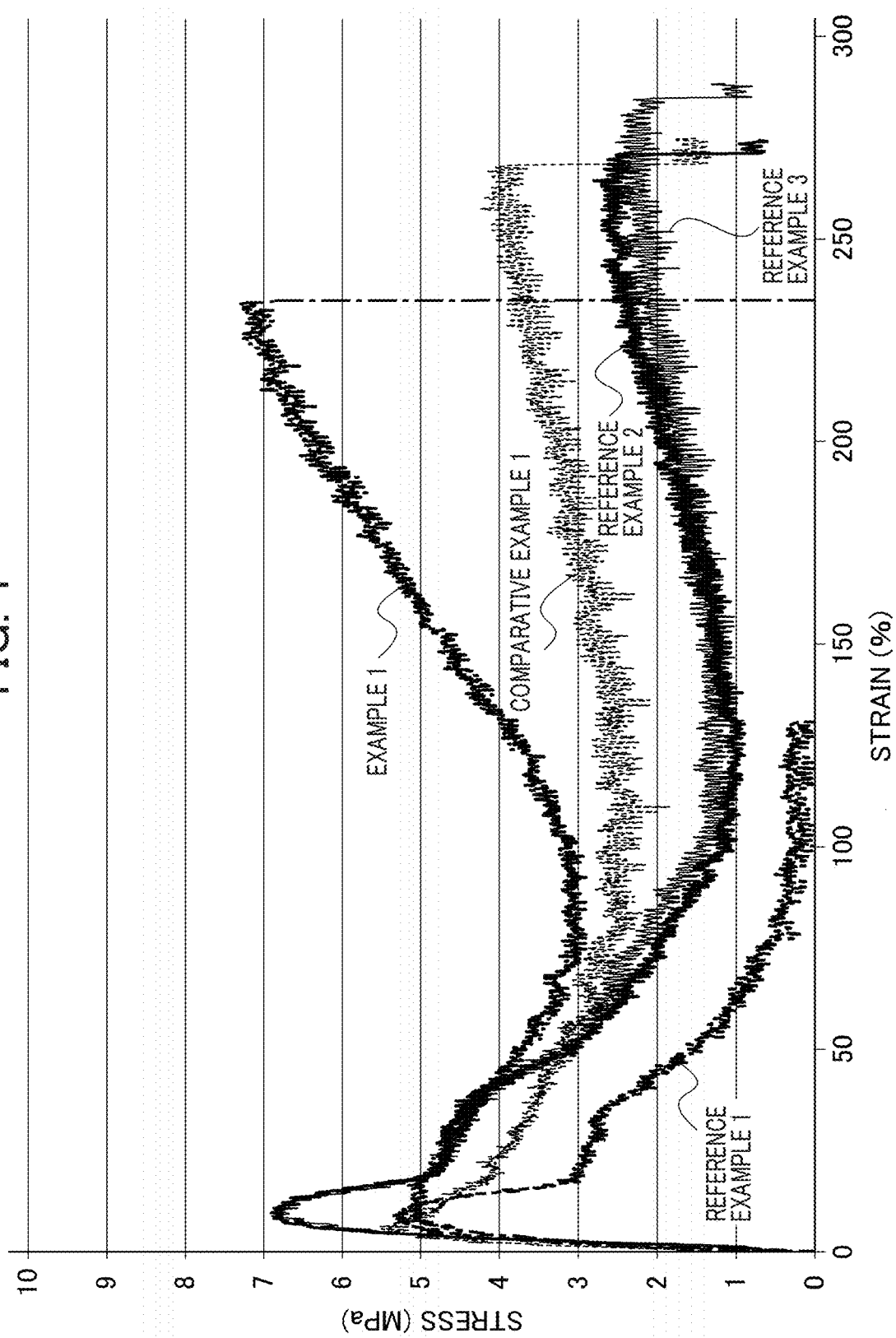
FIG. 1 is a graph illustrating test results at 170° C. exhibiting the effect of the present invention.

Hereinafter, the present invention will be described in detail with reference to embodiments.

⟨Thermoplastic Resin Composition⟩

The thermoplastic resin composition according to the present invention includes at least the thermoplastic resin and the inorganic filler. As the thermoplastic resin, a propylene-based polymer having no long chain branching structure (B) and a propylene-based polymer having a long chain branching structure (A) are included in a specific ratio described below. Hereinafter, each component constituting the thermoplastic resin composition according to the present invention will be described in detail.

⟨Propylene-Based Polymer Having a Long Chain Branching Structure⟩

In the thermoplastic resin composition according to the present invention, the propylene-based polymer having a long chain branching structure (A) is included as one component constituting the thermoplastic resin.

In the present specification, the term a "propylene-based polymer having a long chain branching structure" or "polypropylene having a long chain branching structure" refers to a polypropylene-based polymer or polypropylene having polypropylene chains branched from the polypropylene main chain skeleton. Namely, the term "long chain branch" means branches formed in the polymer main chain by polymerizing monomers and not includes a short chain branch derived from the monomer forming the main chain like a methyl group in the propylene polymer. In the present specification, the "long chain branch" more specifically represents propylene-based polymer residues having a carbon number of five or more and branched from the main chain of the propylene-based polymer. The branch having a carbon number of five or more and the branch having a carbon number of four or less can be distinguished by difference in the peak position of the branching carbon (refer to Macromol. Chem. Phys., 2003, Vol. 204, p. 1738). Here, the description of the related part in this literature is incorporated herein by reference.

On the other hand, the polypropylene main chain skeleton is linear polypropylene that may contain the short branches.

That the polypropylene has the long chain branch can be confirmed by a method according to the rheological properties of the resin, for example, according to a method for calculating a branching index g' using the relation between a molecular weight and a viscosity according to a general method for analyzing an intrinsic viscosity or the like and a method for using $^{13}$C-NMR.

(Branching Index g')

The branching index g' has been known as a direct index with respect to the long chain branch. The detailed description is written in "Developments in Polymer Characterization-4" (J. V. Dawkins ed. Applied Science Publishers, 1983) (the description of the related part in this literature is incorporated herein by reference) and the definition of the branching index g' is as follows.

Branching index $g'=[\eta]_{br}/\eta_{lim}$ $[\eta]_{br}$: Intrinsic viscosity of polymer (br) having a long chain branching structure $[\eta]_{lim}$: Intrinsic viscosity of linear polymer having same molecular weight as polymer (br)

As is clear from the above-described definition, the branching index g' having a value of smaller than 1 results in determining the existence of the long chain branching structure. As the number of the long chain branching structures becomes larger, the value of the branching index g' becomes smaller.

The branching index g' can be obtained as the function of an absolute molecular weight Mabs by using gel permeation chromatography (GPC) equipped with a light scattering meter and a viscometer as detectors. With respect to the measurement method of the branching index g', the detailed description is written in Japanese Patent Application Laid-open No. 2015-40213 (the description of the related part in this literature is incorporated herein by reference) and, for example, the branching index g' can be measured as follows.

[Measurement Method]

GPC: Alliance GPC/V 2000 (manufactured by Waters corporation)

Detectors: Listed in order of connection

Multi-angle laser light scattering detector (MALLS): DAWN-E (manufactured by Wyatt Technology Corporation)

Differential refractometer (RI): Attached in GPC

Viscosity detector (Viscometer): Attached in GPC

Mobile phase solvent: 1,2,4-trichlorobenzene (added in a concentration of 0.5 mg/mL)

Mobile phase flow rate: 1 mL/minute

Column: Connecting two GMHHR-H(S) HTs (manufactured by TOSOH CORPORATION)

Temperature at sample injection part: 140° C.

Column temperature: 140° C.

Detector temperature: 140° C. for all detectors

Sample concentration: 1 mg/mL

Injected amount (sample loop capacity: 0.2175 mL

[Analysis Method]

For determining the absolute molecular weight (Mabs) obtained from the multi-angle laser light scattering detector (MALLS), a square mean radius of inertia (Rg), and an intrinsic viscosity ([η]) obtained from Viscometer, data processing software ASTRA (version 4. 73. 04) attached in MALLS is used and calculation is carried out with reference to the following literature.

Reference literature: "Developments in Polymer Characterization-4" (J. V. Dawkins ed. Applied Science Publishers, 1983. Chapter 1)

Polymer, 45, 6495-6505 (2004)

Macromolecules, 33, 2424-2436 (2000)

Macromolecules, 33, 6945-6952 (2000)

(the descriptions of the related parts in these literatures are incorporated herein by reference).

As the branching index g' that the propylene-based polymer having a long chain branching structure used in the present invention has, g' is 0.30 or more and less than 1.00, more preferably 0.55 or more and 0.98 or less, further preferably 0.75 or more and 0.96 or less, and most preferably 0.78 or more and 0.95 or less when the absolute molecular weight Mabs determined by light scattering is 1,000,000.

As the molecular structure of the propylene-based polymer having a long chain branch (A), comb-shaped chains are considered to be generated. In the case where g' is less than 0.30, this g' means few main chains and an extremely large ratio of the side chains and thus the melt tension may be insufficient. On the other hand, in the case where g' is 1.00, this g' means that no branch exists. Consequently, the drawdown property and the resin extension property cannot be improved even when this propylene-based polymer having a long chain branch (A) is blended to the propylene-based polymer having no long chain branching structure (B). In the case where the branching index g' is within the range of 0.55 or more and 0.98 or less, further 0.75 or more and 0.96 or less, and particularly 0.78 or more and 0.95 or less, sufficient melt tension is achieved and a problem of gelation does not arise. Therefore, the blend of this propylene-based polymer having a long chain branch (A) to the propylene-based polymer having no long chain branching structure (B) described below in a predetermined ratio does not cause deterioration in the formability and processability of the thermoplastic resin composition, improves the drawdown property and the resin extension property better, and, in particular, can reduce generation of the feed failure in a device having a heat setting process at a low level in the case where a sheet is formed.

($^{13}$C-NMR)

As described above, $^{13}$C-NMR can distinguish the short branching structure and the long chain branching structure. The detailed description is written in Macromol. Chem. Phys., 2003, vol. 204, 1738 (the description of the related part in this literature is incorporated herein by reference) and the description is as follows.

The propylene-based polymer having a long chain branching structure (A) has, for example, a specific branching structure as illustrated in the following structural formula (1). In the structural formula (1), $C_a$, $C_b$, and $C_c$ represent methylene carbons adjacent to the branching carbon, $C_{br}$ represents a methine carbon located at the root of the branched chain, and $P^1$, $P^2$, and $P^3$ represent propylene-based polymer residues. Here, $P^1$, $P^2$ and $P^3$ may contain another branching carbon ($C_{br}$) different from $C_{br}$ illustrated in the structural formula (1).

[Chemical Formula 1]

Such a branching structure is identified by $^{13}$C-NMR analysis. The attribution of each peak can refer to the description in Macromolecules, Vol. 35, No. 10, 2002, p. 3839-3842 (the description of the related part in this literature is incorporated herein by reference). Namely, three methylene carbons ($C_a$, $C_b$, and $C_c$) in total are observed in 43.9 ppm to 44.1 ppm, 44.5 ppm to 44.7 ppm, and 44.7 ppm to 44.9 ppm one by one and the methine carbon ($C_{br}$) is observed in 31.5 ppm to 31.7 ppm. Hereinafter, the above-described methine carbon observed in 31.5 ppm to 31.7 ppm may be abbreviated to a branched methine carbon ($C_{br}$).

Three methylene carbons adjacent to the branched methine carbon $C_{br}$ are separately observed as three peaks that are diastereotopically non-equivalent.

Such branched chains attributed by $^{13}$C-NMR indicate the propylene-based polymer residues having a carbon number of five or more and branched from the main chain of the propylene-based polymer. The peak position of this branched chain and the peak position of the branched chain having a carbon number of four or less are different from each other and thus these branched chains can be distinguished. Consequently, the presence or absence of the long chain branching structure can be determined by confirming the peak of this branched methine carbon.

The measurement method of $^{13}$C-NMR in the present specification is as follows.

[$^{13}$C-NMR Measurement Method]

Into an NMR sample tube having an inner diameter of 10 mm, 200 mg of the sample is placed together with 2.4 ml of o-dichlorobenzene/deuterated benzene bromide ($C_6D_5Br$)=4/1 (volume ratio) and hexamethyldisiloxane as a reference substance for chemical shift and dissolved to measure $^{13}$C-NMR.

$^{13}$C-NMR is measured using AV400M type NMR apparatus equipped with a cryoprobe having a diameter of 10 mm manufactured by Bruker BioSpin Corporation.

The measurement is carried out by a complete decoupling method at sample temperature of 120° C. Other conditions are as follows.

Pulse angle: 90°

Pulse interval: 4 seconds

Accumulated count: 20,000 times

The chemical shift of the peak of the methyl carbon in hexamethyldisiloxane is determined to be 1.98 ppm and this chemical shift is used as a reference to the chemical shifts of the peaks of carbons.

The amount of a long chain branch can be calculated using the peak near 44 ppm.

The polypropylene-based polymer having a long chain branch preferably has a long chain branch amount quantitatively determined by the peak near 44 ppm in $^{13}$C-NMR spectrum of 0.01 count/1,000 total propylene or more, more preferably 0.03 count/1,000 total propylene or more, and further preferably 0.05 count/1,000 total propylene or more. The long chain branch amount is preferably 1.00 count/1,000 total propylene or less, more preferably 0.50 count/1,000 total propylene or less, and further preferably 0.30 count/1,000 total propylene or less. The propylene-based polymer having the long chain branch amount within these ranges exhibits sufficient melt tension and does not cause a problem of gelation. Therefore, when the propylene-based polymer having a long chain branching structure (A) is blended to the propylene-based polymer having no long chain branch (B) described below in a predetermined ratio, deterioration in the formability and processability of the thermoplastic resin composition does not occur, the drawdown property and the resin extension property are improved better, and, in particular, generation of the feed failure in a device having a heat setting process can be reduced at a low level in the case where a sheet is formed.

The propylene unit of the propylene-based polymer having a long chain branching structure (A) preferably has a structure having high stereoregularity from the viewpoint that the heat resistance and mechanical properties such as viscoelasticity of the thermoplastic composition according to the present invention are made to be excellent. Specifically, the propylene units preferably have the sufficiently high value of an isotactic triad fraction (mm) (that is, the mm fraction of the three-consecutive propylene units) obtained by $^{13}$C-NMR measurement. Specifically, the propylene units preferably have a high stereoregularity of 90.0% or more.

Here, the mm fraction refers to the ratio of the three-consecutive propylene units having the same direction as the direction of methyl branch in each one unit when any three-consecutive propylene units constituting the polypropylene chain are determined to be one unit and is a value indicating how many stereo-structures of the methyl groups in the molecular chain are controlled as the isotactic structure.

The three-consecutive propylene units can be mainly classified into the three types represented by the formulas (3a) to (3c) described below. The mm fraction can be defined as {Number of units in Formula (3a)}/{Number of units in Formula (3a)+Number of units in Formula (3b)+Number of units in Formula (3c)}×100. This value is preferably 90.0% or more and further 91.0% or more, further preferably 93.0% or more, and particularly preferably 95.0% or more from the viewpoint of the heat resistance and mechanical properties such as viscoelasticity of the thermoplastic composition of the propylene-based polymer having a long chain branch (A) and a composition including the propylene-based polymer having a long chain branch (A). The upper limit of the value is 100.0%. However, usually, the upper limit is further preferably 99.8% or less or further 99.5% or less and further more preferably 99.0% or less from the viewpoints of a degree of difficulty in product production control and the cost due to this difficulty.

The mm fraction of the three-consecutive propylene units can be calculated, for example, by using the result obtained by $^{13}$C-NMR measurement measured under the same conditions as the conditions in the analysis of the branching structure with $^{13}$C-NMR. In this case, the preparation conditions of the sample and the measurement conditions of $^{13}$C-NMR are not particularly limited as long as the conditions are conditions that can suitably quantitatively determine the propylene units. For example, $^{13}$C-NMR is measured by placing 390 mg of the sample together with 2.6 ml of o-dichlorobenzene/deuterated benzene bromide ($C_6D_5Br$)=4/1 (volume ratio) and 2.6 ml of hexamethyldisiloxane as a reference substance for chemical shift and dissolved in an NMR sample tube having an inner diameter of 10 mm, and using the known spectrometer.

Pulse angle: 90°
Pulse interval: 15 seconds
Resonant frequency: 100 MHz or more
Accumulated count: 128 times or more
Observation range: −20 ppm to 179 ppm The attribution of each peak can refer to the description in Macromolecules, Vol. 35, No. 10, 2002, p. 3839-3842 described above.

Three types of three-consecutive propylene units constituting the propylene-based polymer are represented in the following formula (3a) to the following formula (3c). The following formula (3a) represents an mm structure, the following formula (3b) represents an mr structure, and the following formula (3c) represents an rr structure.

The $^{13}$C-NMR measurement result used in the mm fraction of the three-consecutive propylene units specifically refers to the result of quantitatively determining the amount of the methyl group using the peak of the carbon derived from the methyl group in the center propylene in the three-consecutive propylene units represented in the following formula (3a) to the following formula (3c).

The chemical shifts of the three types of the methyl group are as follows.

mm: In the vicinity of 24.3 ppm to 21.1 ppm
mr: In the vicinity of 21.2 ppm to 20.5 ppm
rr: In the vicinity of 20.5 ppm to 19.8 ppm The range of the chemical shift of the three types of the methyl groups to which attention is paid is approximately the above-described range of the chemical shift. The range of the chemical shift may slightly vary depending on the molecular weight or the like. However, the recognition of the signal derived from the methyl group to which attention is paid is easy.

The propylene-based polymer having a long chain branching structure (A) preferably has a melt flow rate (MFR) measured in accordance with JIS K7210-1: 2014 (ISO 1133-1: 2011) at a temperature of 230° C. and a load of 2.16 kg of 1.0 g/10 minutes to 10.0 g/10 minutes. The melt flow rate is preferably 1.0 g/10 minutes to 3.0 g/10 minutes and further preferably 1.0 g/10 minutes to 2.5 g/10 minutes.

The propylene-based polymer having a long chain branch (A) having MFR within the above-described range does not cause deterioration in processability by causing significant reduction in flowability of the thermoplastic resin composition including the propylene-based polymer having a long chain branch (A). On the other hand, the heat resistance and stretch resistance of the formed article such as a sheet in a predetermined temperature range can be improved by blending the propylene-based polymer having a long chain branch (A) with the propylene-based polymer having no long chain branch (B) described below in a predetermined amount.

The propylene-based polymer having a long chain branching structure (A) preferably has a melt tension at a temperature of 230° C. of 5 g to 30 g, more preferably 10 g to 30 g, and further preferably 14 g to 30 g.

The propylene-based polymer having a long chain branch (A) having the melt tension within the above-described range allows the volume expansion rate at the time of passing through the device having a heat setting process as described above to be more excellently reduced in the formed article such as a sheet formed by using the thermoplastic resin composition including the propylene-based polymer having a long chain branch (A). Consequently, the possibility of generating the failure of the feeding property can be reduced.

The melt tension in the present invention is a value measured under the following conditions.

[Measurement Conditions]

Measurement apparatus: Capillograph 1B manufactured by Toyo Seiki Seisaku-sho, Ltd.

Capillary: Diameter 2.0 mm and length 40 mm

Cylinder diameter: 9.55 mm

Cylinder extrusion rate: 20 mm/minute

Draw rate: 4.0 m/minute (with the proviso that, in the case where the resin breaks due to excessively high melt tension, the draw rate lowers and the measurement is carried out at a maximum rate in which the resin can be drawn).

Temperature: 230° C.

For the propylene-based polymer having a long chain branching structure (A), the value of the melt tension preferably further satisfies the following condition including the value of the melt flow rate (MFR) described above.

$$\log(\text{Melt tension}) \geq -0.9 \times \log(\text{MFR}) + 0.7 \text{ or } 30 \geq \text{Melt tension} \geq 15$$

In the case where the melt tension satisfies this condition, the heat resistance when the formed article described above passes through the device having a heat setting process can be improved while the processability such as the extension property of the resin composition is being maintained in an excellent state by blending the propylene-based polymer having a long chain branching structure (A) to the polymer having no long chain branching structure (B) described below.

The melt tension more preferably satisfies the following condition:

$$\log(\text{Melt tension}) \geq -0.9 \times \log(\text{MFR}) + 0.9 \text{ or } 30 \geq \text{Melt tension} \geq 15$$

and further preferably satisfies the following condition:

$$\log(\text{Melt tension}) \geq -0.9 \times \log(\text{MFR}) + 1.1 \text{ or } 30 \geq \text{Melt tension} \geq 15.$$

Generally, as a method for producing the propylene-based polymer having a long chain branching structure (A), a method of introducing the branching structure by modification using radiation rays and peroxides, a method of using two-stage polymerization, a method of adding a trace amount of dienes, a macromer copolymerization method in which, for example, propylene macromer having a vinyl structure at the end is produced using a metallocene catalyst by a specific complex and specific polymerization conditions in a polymerization first stage (macromer synthesis step) and thereafter the macromer is copolymerized with propylene by a specific catalyst and specific polymerization conditions in a polymerization second stage (macromer copolymerization step) to form the long chain branching structure and the like have been known. The metallocene catalyst used in the macromer copolymerization method is different from a simple and non-crosslinked metallocene catalyst used for the synthesis of linear polypropylene. A crosslinked metallocene, a half metallocene, and, although not particularly limited, for example, a silylene-crosslinked metallocene complex or the like are used as the catalyst having high selectivity.

The method for producing the propylene-based polymer having a long chain branching structure (A) used in the present invention is not particularly limited as long as the propylene-based polymer having a long chain branching structure (A) has the above-described given properties and any production methods may be employed. However, from the viewpoint that the propylene-based polymer having a long chain branching structure (A) desirably has a structure having high stereoregularity as described above, the propylene-based polymer having a long chain branching structure (A) synthesized by the macromer copolymerization method using the metallocene catalyst can be preferably exemplified. The synthesis method for polymerizing using the specific metallocene catalyst as described above is described, for example, in Japanese Patent Application Laid-open No. 2009-299025 in detail (the description of the related part in this literature is incorporated herein by reference).

As one preferable example for producing the propylene-based polymer having a long chain branching structure, a method for producing a propylene-based polymer using the following catalyst components (K), (L), and (M) for the propylene polymerization catalyst can be exemplified.

(K): Two or more of transition metal compounds in the group 4 of the periodic table selected from at least one compound of the component [K-1] that is a compound represented by the following general formula (k1) and at least one compound of the component [K-2] that is a compound represented by the general formula (k2) illustrated below.

(L): Ion-exchangeable layered silicate, and (M): Organic aluminum compound.

Hereinafter, the catalyst components (K), (L), and (M) will be described in detail.

Catalyst Component (K)

(i) Component [K-1]: A Compound Represented by the Following General Formula (k1)

[Chemical Formula 2]

[In the general formula (k1), R1 and R2 each independently represent a heterocyclic group having a carbon number of 4 to 16 and containing nitrogen, oxygen, or sulfur; R3 and R4 each independently represent an aryl group having a carbon number of 6 to 16 and optionally containing halogen, silicon, oxygen, sulfur, nitrogen, boron, phosphorus, or a plurality of hetero elements selected from these elements or a heterocyclic group having a carbon number of 6 to 16 and containing nitrogen, oxygen, or sulfur; furthermore, X1 and Y1 each independently represent a hydrogen atom, a halogen atom, a hydrocarbon group having a carbon number of 1 to 20, a silicon-containing a hydrocarbon group having a carbon number of 1 to 20, a halogenated-hydrocarbon group having a carbon number of 1 to 20, an oxygen-containing hydrocarbon group having a carbon number of 1 to 20, an amino group, or a nitrogen-containing hydrocarbon group having a carbon number of 1 to 20; and Q1 represents a divalent hydrocarbon group having a carbon number of 1 to 20 or a silylene group or a germylene group optionally containing a hydrocarbon group having a carbon number of 1 to 20].

The heterocyclic group having a carbon number of 4 to 16 and containing nitrogen, oxygen, or sulfur in R1 and R2 is preferably a 2-furyl group, a substituted 2-furyl group, a substituted 2-thienyl group, and a substituted 2-furfuryl group and more preferably the substituted 2-furyl group.

Examples of the substituent of the substituted 2-furyl group, the substituted 2-thienyl group, and the substituted 2-furfuryl group include an alkyl group having a carbon number of 1 to 6 such as a methyl group, an ethyl group, and a propyl group; a halogen atom such as a fluorine atom and a chlorine atom; an alkoxy group having a carbon number of 1 to 6 such as a methoxy group and an ethoxy group; and a trialkylsilyl group. Of these groups, the methyl group and the trimethylsilyl group are preferable and the methyl group is particularly preferable.

As R1 and R2, a 2-(5-methyl)-furyl group is particularly preferable. R1 and R2 are preferably the same group as each other.

The aryl group having a carbon number of 6 to 16 and optionally containing halogen, silicon, oxygen, sulfur, nitrogen, boron, phosphorus, or a plurality of hetero elements selected from these elements of R3 and R4 may have one or more hydrocarbon groups having a carbon number of 1 to 6, silicon-containing hydrocarbon groups having a carbon number of 1 to 6, and halogen-containing hydrocarbon groups having a carbon number of 1 to 6 as the substituents on the aryl ring skeleton in the range of a carbon number of 6 to 16.

At least one of R3 and R4 is preferably a phenyl group, a 4-methylphenyl group, a 4-i-propylphenyl group, a 4-t-butylphenyl group, a 4-trimethylsilylphenyl group, a 2,3-dimethylphenyl group, a 3,5-di-t-butylphenyl group, a 4-phenyl-phenyl group, a chlorophenyl group, a naphthyl group, or a phenanthryl group and further preferably the phenyl group, the 4-i-propylphenyl group, the 4-t-butylphenyl group, the 4-trimethylsilylphenyl group, and a 4-chlorophenyl group. R3 and R4 are preferably the same group as each other.

In the general formula (k1), X1 and Y1 are auxiliary ligands and generate active metallocene having olefin polymerization ability by reacting with the co-catalyst of the catalyst component (L). Therefore, the kinds of the ligands of X1 and Y1 are not limited as long as this object is achieved. X1 and Y1 each independently represent a hydrogen atom, a halogen atom, a hydrocarbon group having a carbon number of 1 to 20, a silicon-containing hydrocarbon group having a carbon number of 1 to 20, a halogenated-hydrocarbon group having a carbon number of 1 to 20, an oxygen-containing hydrocarbon group having a carbon number of 1 to 20, an amino group, or a nitrogen-containing hydrocarbon group having a carbon number of 1 to 20.

In the general formula (k1), Q1 represents any one of a divalent hydrocarbon group having a carbon number of 1 to 20 or a silylene group or a germylene group optionally containing a hydrocarbon group having a carbon number of 1 to 20 for bonding two five-membered rings. In the case where two hydrocarbon groups exist in the silylene group or the germylene group, these groups may be bonded to each other to form a ring structure.

Specific examples of Q1 include an alkylene group such as methylene, methylmethylene, dimethylmethylene, and 1,2-ethylene; an arylalkylene group such as diphenylmethylene; a silylene group; an alkylsilylene group such as methylsilylene, dimethylsilylene, deethylsilylene, di(n-propyl)silylene, di(i-propyl)silylene, and di(cyclohexyl)silylene; an (alkyl)(aryl)silylene group such as methyl(phenyl)silylene; an arylsilylene group such as diphenylsilylene; an alkyloligosilylene group such as tetramethyldisilylene; a germylene group; an alkylgermylene group in which silicon of the silylene group having divalent hydrocarbon group having a carbon number of 1 to 20 is substituted with germanium; an (alkyl)(aryl)germylene group; and an arylgermylene group.

Of these compounds, the silylene group having a hydrocarbon group having a carbon number of 1 to 20 or the germylene group having a hydrocarbon group having a carbon number of 1 to 20 is preferable and the alkylsilylene group and the alkylgermylene group are particularly preferable.

Specific examples of the compound represented by the general formula (k1) include dichloro[1,1'-dimethylsilylenebis{2-(2-furyl)-4-phenyl-indenyl}]hafnium, dichloro[1,1'-dimethylsilylenebis{2-(2-thienyl)-4-phenyl-indenyl}]hafnium, dichloro[1,1'-dimethylsilylenebis{2-(5-methyl-2-furyl)-4-phenyl-indenyl}]hafnium, dichloro[1,1'-diphenylsilylenebis{2-(5-methyl-2-furyl)-4-phenyl-indenyl}]hafnium, dichloro[1,1'-dimethylgermylenebis{2-(5-methyl-2-furyl)-4-phenyl-indenyl}]hafnium, dichloro[1,1'-dimethylgermylenebis{2-(5-methyl-2-thienyl)-4-phenyl-indenyl}]hafnium, dichloro[1,1'-dimethylsilylenebis{2-(5-t-butyl-2-furyl)-4-phenyl-indenyl}]hafnium, dichloro[1,1'-dimethylsilylenebis{2-(5-trimethylsilyl-2-furyl)-4-phenyl-indenyl}]hafnium, dichloro[1,1'-dimethylsilylenebis{2-(5-phenyl-2-furyl)-4-phenyl-indenyl}]hafnium, dichloro[1,1'-dimethylsilylenebis{2-(4,5-dimethyl-2-furyl)-4-phenyl-indenyl}]hafniumdichloride, dichloro[1,1'-dimethylsilylenebis{2-(2-benzofuryl)-4-phenyl-indenyl}]hafnium, dichloro[1,1'-dimethylsilylenebis{2-(5-methyl-2-furyl)-4-(4-methylphenyl)-indenyl}]hafnium, dichloro[1,1'-dimethylsilylenebis{2-(5-methyl-2-furyl)-4-(4-isopropylphenyl)-indenyl}]hafnium, dichloro[1,1'-dimethylsilylenebis{2-(5-methyl-2-furyl)-4-(4-trimethylsilylphenyl)-indenyl}]hafnium, dichloro[1,1'-dimethylsilylenebis{2-(2-furfuryl)-4-phenyl-indenyl}]hafnium, dichloro[1,1'-dimethylsilylenebis{2-(5-methyl-2-furyl)-4-(4-chlorophenyl)-indenyl}]hafnium, dichloro[1,1'-dimethylsilylenebis{2-(5-methyl-2-furyl)-4-(4-fluorophenyl)-indenyl}]hafnium, dichloro[1,1'-dimethylsilylenebis{2-(5-methyl-2-furyl)-4-(4-trifluoromethylphenyl)-indenyl}]hafnium, dichloro[1,1'-dimethylsilylenebis{2-(5-methyl-2-furyl)-4-(4-t-butylphenyl)-indenyl}]hafnium, dichloro[1,1'-dimethylsilylenebis{2-(2-furyl)-4-(1-naphthyl)-indenyl}]hafnium, dichloro[1,1'-dimethylsilylenebis{2-(2-furyl)-4-(2-naphthyl)-indenyl}]hafnium, dichloro[1,1'-dimethylsilylenebis{2-(2-furyl)-4-(2-phenanthryl)-indenyl}]hafnium, dichloro[1,1'-dimethylsilylenebis{2-(2-furyl)-4-(9-phenanthryl)-indenyl}]hafnium, dichloro[1,1'-dimethylsilylenebis{2-(5-methyl-2-furyl)-4-(1-naphthyl)-indenyl}]hafnium, dichloro[1,1'-dimethylsilylenebis{2-(5-methyl-2-furyl)-4-(2-naphthyl)-indenyl}]hafnium, dichloro[1,1'-dimethylsilylenebis{2-(5-methyl-2-furyl)-4-(2-phenanthryl)-indenyl}]hafnium, dichloro[1,1'-dimethylsilylenebis{2-(5-methyl-2-furyl)-4-(9-phenanthryl)-indenyl}]hafnium, dichloro[1,1'-dimethylsilylenebis{2-(5-t-butyl-2-furyl)-4-(1-naphthyl)-indenyl}]hafnium, dichloro[1,1'-dimethylsilylenebis{2-(5-t-butyl-2-furyl)-4-(2-naphthyl)-indenyl}]hafnium, dichloro[1,1'-dimethylsilylenebis{2-(5-t-butyl-2-furyl)-4-(2-phenanthryl)-indenyl}]hafnium, and dichloro[1,1'-dimethylsilylenebis{2-(5-t-butyl-2-furyl)-4-(9-phenanthryl)-indenyl}]hafnium.

(ii) Component [K-2]: A Compound Represented by the Following General Formula (k2)

[Chemical Formula 3]

[In the general formula (k2), R5 and R6 each independently are a hydrocarbon group having a carbon number of 1 to 6; R7 and R8 each independently are an aryl group having a carbon number of 6 to 16 and optionally containing halogen, silicon, oxygen, sulfur, nitrogen, boron, phosphorus, or a plurality of hetero elements selected from these hetero elements; X2 and Y2 each independently represent a hydrogen atom, a halogen atom, a hydrocarbon group having a carbon number of 1 to 20, a silicon-containing hydrocarbon group having a carbon number of 1 to 20, a halogenated-hydrocarbon group having a carbon number of 1 to 20, an oxygen-containing hydrocarbon group having a carbon number of 1 to 20, an amino group, or a nitrogen-containing hydrocarbon group having a carbon number of 1 to 20; Q2 represents a divalent hydrocarbon group having a carbon number of 1 to 20 or a silylene group or a germylene group optionally containing a hydrocarbon group having a carbon number of 1 to 20; and M is zirconium or hafnium].

R5 and R6 each independently are a hydrocarbon group having a carbon number of 1 to 6, preferably an alkyl group, and further preferably an alkyl group having a carbon number of 1 to 4. Specific examples include methyl, ethyl, n-propyl, i-propyl, n-butyl, i-butyl, sec-butyl, n-pentyl, i-pentyl, and n-hexyl and methyl, ethyl, and n-propyl are preferable.

R7 and R8 each independently are an aryl group having a carbon number of 6 to 16 and preferably a carbon number of 6 to 12 and optionally containing halogen, silicon, or a plurality of hetero elements selected from these elements. Preferable examples include phenyl, 3-chlorophenyl, 4-chlorophenyl, 3-fluorophenyl, 4-fluorophenyl, 4-methylphenyl, 4-i-propylphenyl, 4-t-butylphenyl, 4-trimethylsilylphenyl, 4-(2-fluoro-4-biphenylyl), 4-(2-chloro-4-biphenylyl), 1-naphthyl, 2-naphthyl, 4-chloro-2-naphthyl, 3-methyl-4-trimethylsilylphenyl, 3,5-dimethyl-4-t-butylphenyl, 3,5-dimethyl-4-trimethylsilylphenyl, and 3,5-dichloro-4-trimethylsilylphenyl.

X2 and Y2 are auxiliary ligands and generate active metallocene having olefin polymerization ability by reacting with the co-catalyst of the catalyst component (L). Therefore, the kinds of the ligands of X2 and Y2 are not limited as long as this object is achieved. X2 and Y2 each independently represent a hydrogen atom, a halogen atom, a hydrocarbon group having a carbon number of 1 to 20, a silicon-containing hydrocarbon group having a carbon number of 1 to 20, a halogenated-hydrocarbon group having a carbon number of 1 to 20, an oxygen-containing hydrocarbon group having a carbon number of 1 to 20, an amino group, or a nitrogen-containing hydrocarbon group having a carbon number of 1 to 20.

Q2 is a bonding group that crosslinks two conjugated five-membered ring ligands and is a divalent hydrocarbon group having a carbon number of 1 to 20, a silylene group optionally having a hydrocarbon group having a carbon number of 1 to 20, and a germylene group optionally having a hydrocarbon group having a carbon number of 1 to 20 and preferably a substituted silylene group or a substituted germylene group. The substituent bonded to silicon or germanium is preferably a hydrocarbon group having a carbon number 1 to 12 and two substituents may be linked.

Specific examples of Q2 include methylene, dimethylmethylene, ethylene-1,2-diyl, dimethylsilylene, diethylsilylene, diphenylsilylene, methylphenylsilylene, 9-silafluorene-9,9-diyl, dimethylsilylene, diethylsilylene, diphenylsilylene, methylphenylsilylene, 9-silafluorene-9,9-diyl, dimethylgermylene, diethylgermylene, diphenylgermylene, and methylphenylgermylene.

M is zirconium or hafnium and preferably hafnium.

Specific examples of the metallocene compound represented by the general formula (k2) include dichloro{1,1'-dimethylsilylenebis(2-methyl-4-phenyl-4-hydroazurenyl)}hafnium, dichloro[1,1'-dimethylsilylenebis{2-methyl-4-(4-chlorophenyl)-4-hydroazurenyl}]hafnium, dichloro[1,1'-dimethylsilylenebis{2-methyl-4-(4-t-butylphenyl)-4-hydroazurenyl}]hafnium, dichloro[1,1'-dimethylsilylenebis{2-methyl-4-(4-trimethylsilylphenyl)-4-hydroazurenyl}]hafnium, dichloro[1,1'-dimethylsilylenebis{2-methyl-4-(3-chloro-4-t-butylphenyl)-4-hydroazurenyl}]hafnium, dichloro[1,1'-dimethylsilylenebis{2-methyl-4-(3-methyl-4-t-butylphenyl)-4-hydroazurenyl}]hafnium, dichloro[1,1'-dimethylsilylenebis{2-methyl-4-(3-chloro-4-trimethylsilylphenyl)-4-hydroazurenyl}]hafnium, dichloro[1,1'-dimethylsilylenebis{2-methyl-4-(3-methyl-4-trimethylsilylphenyl)-4-hydroazurenyl}]hafnium, dichloro[1,1'-dimethylsilylenebis{2-methyl-4-(1-naphthyl)-4-hydroazurenyl}]hafnium, dichloro[1,1'-dimethylsilylenebis{2-methyl-4-(2-naphthyl)-4-hydroazurenyl}]hafnium, dichloro[1,1'-dimethylsilylenebis{2-methyl-4-(4-chloro-2-naphthyl)-4-hydroazurenyl}]hafnium, dichloro[1,1'-dimethylsilylenebis{2-methyl-4-(2-fluoro-4-biphenylyl)-4-hydroazurenyl}]hafnium, dichloro[1,1'-dimethylsilylenebis{2-methyl-4-(2-chloro-4-biphenylyl)-4-hydroazurenyl}]hafnium, dichloro[1,1'-dimethylsilylenebis{2-methyl-4-(9-phenanthryl)-4-hydroazurenyl}]hafnium, dichloro[1,1'-dimethylsilylenebis{2-ethyl-4-(4-chlorophenyl)-4-hydroazurenyl}]hafnium, dichloro[1,1'-dimethylsilylenebis{2-n-propyl-4-(3-chloro-4-trimethylsilylphenyl)-4-hydroazurenyl}]hafnium, dichloro[1,1'-dimethylsilylenebis{2-ethyl-4-(3-chloro-4-t-butylphenyl)-4-hydroazurenyl}]hafnium, dichloro[1,1'-dimethylsilylenebis{2-ethyl-4-(3-methyl-4-trimethylsilylphenyl)-4-hydroazurenyl}]hafnium, dichloro[1,1'-dimethylgermylenebis{2-methyl-4-(2-fluoro-4-biphenylyl)-4-hydroazurenyl}]hafnium, dichloro[1,1'-dimethylgermylenebis{2-methyl-4-(4-t-butylphenyl)-4-hydroazurenyl}]hafnium, dichloro[1,1'-(9-silafluorene-9,9-diyl)bis{2-ethyl-4-(4-chlorophenyl)-4-hydroazurenyl}]hafnium, dichloro[1,1'-dimethylsilylenebis{2-ethyl-4-(4-chloro-2-naphthyl)-4-hydroazurenyl}]hafnium, dichloro[1,1'-dimethylsilylenebis{2-ethyl-4-(2-fluoro-4-biphenylyl)-4-hydroazurenyl}]hafnium, and dichloro[1,1'-(9-silafluorene-9,9-diyl)bis{2-ethyl-4-(3,5-dichloro-4-trimethylsilylphenyl)-4-hydroazurenyl}]hafnium. The compounds including hafnium as the center metal are described and the compounds replaced with zirconium can also be similarly exemplified.

(L): Ion-Exchangeable Layered Silicate

The ion-exchangeable layered silicate (hereinafter, may be simply referred to as silicate) refers to a silicate compound having a crystal structure in which the surfaces constituted by ion bonding or the like are parallelly stacked by bonding force with each other and being capable of exchanging the contained ion. A large portion of silicates are mainly produced as the main component of clay mineral in nature. Therefore, contaminations except ion-exchangeable layered silicate (for example, quartz and cristobalite) may be frequently contained. These contaminations may be contained. The contaminated silicate may have more preferable properties than the properties of the pure silicate depending on the type, the amount, the particle diameter, the crystalline property, and the dispersion state of these contaminations and such a complex is also included in the catalyst component (L).

The silicate to be used is not limited to natural products. Artificially synthetic products may also be used and materials including these products may also be used.

Specific examples of the silicate include a smectite group such as montmorillonite, sauconite, baydelite, nontronite, saponite, hectorite, and stevensite; a vermiculite group such as vermiculite, a mica group such as mica, illite, sericite, and glauconite; attapulgite, sepiolite, palygorskite, bentonite, pyrophyllite, talc, and a chlorite group.

The silicate is preferably a silicate having 2:1 type structure as the main component, more preferably the smectite group, and particularly preferably montmorillonite. The type of interlayer cation is not particularly limited. From the viewpoint that the materials are relatively easily available and can be obtained inexpensively as industrial raw materials, the silicate containing an alkali metal or an alkaline earth metal as the main component of the interlayer cation is preferable.

The ion-exchangeable layered silicate (L) can be used as it is without any particular treatment. However, chemical treatment is preferably carried out. As the chemical treatment of the ion-exchangeable layered silicate, both of the surface treatment for removing impurities attached to the surface and the treatment for providing an effect to the structure of the clay may be used. Specific examples include acid treatment, alkali treatment, salt treatment, and organic substance treatment. Usually, the ion-exchangeable layered silicate includes adsorbed water and interlayer water and is preferably used as the catalyst component (L) after removing these adsorbed water and interlayer water. The particularly preferable ion-exchangeable layered silicate as the catalyst component (N) is an ion-exchangeable layered silicate obtained by the salt treatment and/or acid treatment and having a water content of 3% by weight or less.

The ion-exchangeable layered silicate can be treated with the organic aluminum compound serving as the catalyst component (M) described below before catalyst formation or use as catalyst. The amount of the catalyst component (M) to be used relative to 1 g of the ion-exchangeable layered silicate is not particularly limited. The treatment is carried out at an amount of usually 20.0 mmol or less and preferably 0.5 mmol or more and 10.0 mmol or less. The treatment temperature and treatment time are not limited. The treatment is carried out in a treatment temperature of usually 0° C. or more and 70° C. or less and a treatment time of 10 minutes or more and 3 hours or less. Washing can be carried out after the treatment and is preferable. As a solvent, the same hydrocarbon solvent as the solvent used for prepolymerization or slurry polymerization described below is used.

M): Organic Aluminum Compound

The organic aluminum compound used as the catalyst component (M) is suitably a compound represented by a general formula: $(AlR^9{}_qZ_{3-q})_p$.

In the formula, $R^9$ represents a hydrocarbon group having a carbon number of 1 to 20; Z represents halogen, a hydrogen atom, an alkoxy group, or an amino group; and q and p represent an integer of 1 to 3 and 1 and 2, respectively.

As $R^9$, the alkyl group is preferable. As Z, chlorine is preferable in the case of halogen, an alkoxy group having a carbon number of 1 to 8 is preferable in the case of the alkoxy group, and an amino group having a carbon number of 1 to 8 is preferable in the case of the amino group.

The compound represented by this formula may be used singly, used by mixing a plurality types of the compound, or used in combination.

Specific examples of the organic aluminum compound include trimethylaluminum, triethylaluminum, trinormalpropylaluminum, trinormalbutylaluminum, triisobutylaluminum, trinormalhexylaluminum, trinormaloctylaluminum, trinormaldecylaluminum, diethylaluminum chloride, diethylaluminum sesquichloride, diethylaluminum hydride, diethylaluminum ethoxide, diethylaluminum dimethylamide, diisobutylaluminum hydride, and diisobutylaluminum chloride.

The catalyst can be formed by contacting each of the above-described catalyst components (K) to (M) in a (pre) polymerization tank simultaneously, continuously, or once or multiple times.

The contact of each of the components is usually carried out in an aliphatic hydrocarbon solvent or an aromatic hydrocarbon solvent. The contact temperature is not particularly limited and the contact is preferably carried out between −20° C. to 150° C. As the order of the contact, any purposeful combination may be used. Particularly preferable combinations for each of the components will be described as follows.

In the case where the catalyst component (L) is used, it is possible that the catalyst component (M) is in contact with either the catalyst component (K) or the catalyst component (L), or both of the catalyst component (K) and catalyst component (L) before the catalyst component (K) is in contact with the catalyst component (L); the catalyst component (K) is in contact with the catalyst component (L) and at the same time is in contact with the catalyst component (M); or the catalyst component (K) is in contact with the catalyst component (L) and thereafter the contended catalyst components are in contact with the catalyst component (M). The method in which the catalyst component (M) is in contact with either catalyst component (K) or catalyst component (L) before the catalyst component (K) is in contact with the catalyst component (L) is preferable.

After contacting each of the components, the resultant mixture can be washed with aliphatic hydrocarbon or aromatic hydrocarbon.

The amounts of the catalyst components (K), (L), and (M) to be used are any amounts. For example, the amount of the catalyst component (K) to be used relative to the catalyst component (L) is preferably in the range of 0.1 μmol to 1,000.0 μmol and particularly preferably in the range of 0.5 μmol to 500.0 μmol relative to 1 g of the catalyst component (L). The amount of the catalyst component (M) relative to the catalyst component (K) is preferably in the range of 0.01 to $5.00 \times 10^6$ and particularly preferably in the range of 0.1 to $1.0 \times 10^4$ in the molar ratio of the transition metal.

In the range where the above-described properties are satisfied by the polypropylene resin having a long chain branch (A), the ratio of the component [K-1] (the compound represented by the general formula (k1)] and the component [K-2] (the compound represented by the general formula (k2)] to be used is any ratio. The ratio to be used is preferably 0.30 or more and 0.99 or less in the molar ratio of the transition metal of [K-1] relative to the total amount of each of the component [K-1] and [K-2].

Change in this ratio allows the balance between the melt property and catalyst activity to be controlled. In other words, a terminal vinyl macromer having a low molecular weight is generated from the component [K-1] and a high molecular weight product formed by copolymerizing a part of the macromer is generated from the component [K-2]. Consequently, change in the ratio of the component [K-1] allows the average molecular weight, molecular weight distribution, deviation of the molecular weight distribution to the higher molecular weight side, extremely high molecular weight component, and branch (quantity, length, and distribution) to be controlled. This allows the melt properties such as the branching index g', the melt tension, and the extension property to be controlled.

In order to produce the polypropylene resin having a long chain branch (A), the molar ratio is preferably 0.30 or more, more preferably 0.40 or more, and further preferably 0.50 or more. The upper limit of the molar ratio is preferably in 0.99 or less. In order to obtain the polypropylene resin having a long chain branch (A) efficiently by high catalyst activity, the upper limit is preferably in the range of 0.95 or less and further preferably in the range of 0.90 or less.

The use of the component [K-1] in the above range allows the balance between the average molecular weight and the catalyst activity to the amount of hydrogen to be adjusted.

The catalyst is preferably subjected to prepolymerization treatment in which olefin is in contact with the catalyst to polymerize in a small amount. Carrying out the prepolymerization treatment allows the generation of gel to be prevented when the main polymerization is carried out.

The olefin used at the time of prepolymerization is not particularly limited. Examples of the olefin include propylene, ethylene, 1-butene, 1-hexene, 1-octene, 4-methyl-1-pentene, 3-methyl-1-butene, a vinylcycloalkane, and styrene. As the method for feeding the olefin, any methods such as a method of maintaining the feed of the olefin so as to be in a constant rate or in a constant pressure state in the reaction tank, a method of combining the constant rate and the constant pressure, or a method of changing the feed stepwise can be used.

The temperature and time of the prepolymerization are not particularly limited and are preferably in the range of −20° C. to 100° C. for 5 minutes to 24 hours, respectively. As the amount of the prepolymerization, the amount of the prepolymerized polymer is preferably 0.01 to 100 and further preferably 0.1 to 50 relative to the amount of the catalyst component (K) in a weight ratio. The catalyst component (M) may be added or additionally added at the time of the prepolymerization. After completion of the prepolymerization, washing can be carried out.

A method in which, at the time of the contact or after the contact of each of the components, the solid of a polymer such as polyethylene and polypropylene and an inorganic oxide such as silica and titania coexist with each of the components can also be used.

As the polymerization type, any types may be employed as long as the catalyst for olefin polymerization including the catalyst component (K), the catalyst component (L), and the catalyst component (M) and a monomer are efficiently in contact with each other.

Specifically, a slurry method using an inert solvent, what is called a bulk method substantially not using the inert solvent and using propylene as a solvent, a solution polymerization method, or a gas phase method substantially not using a liquid solvent and maintaining each monomer in a gaseous state may be employed. A method of continuous polymerization or batch polymerization may also be employed. In addition to the single-stage polymerization, the multi-stage polymerization of two or more stages may be employed.

In the case of the slurry polymerization, a saturated aliphatic hydrocarbon or an aromatic hydrocarbon such as hexane, heptane, pentane, cyclohexane, benzene, and toluene is used singly or as a mixture as a polymerization solvent.

The polymerization temperature is usually 0° C. or more and 150° C. or less. In particular, in the case where the bulk polymerization is used, the polymerization temperature is preferably 40° C. or more and further preferably 50° C. or more. The upper limit of the polymerization temperature is preferably 80° C. or less and further preferably 75° C. or less.

In the case where the gas phase polymerization is used, the polymerization temperature is preferably 40° C. or more and further preferably 50° C. or more. The upper limit of the polymerization temperature is preferably 100° C. or less and further preferably 90° C. or less.

The polymerization pressure is preferably 1.0 MPa or more and 5.0 MPa or less. In particular, in the case where the bulk polymerization is used, the polymerization pressure is preferably 1.5 MPa or more and further preferably 2.0 MPa or more. The upper limit of the polymerization pressure is preferably 4.0 MPa or less and further preferably 3.5 MPa or less.

In the case where gas phase polymerization is used, the polymerization pressure is preferably 1.5 MPa or more and further preferably 1.7 MPa or more. The upper limit of the polymerization pressure is preferably 2.5 MPa or less and further preferably 2.3 MPa or less.

Hydrogen can be auxiliarily used in the range of preferably $1.0 \times 10^{-6}$ or more and $1.0 \times 10^{-2}$ or less relative to propylene in a molar ratio as a molecular weight adjuster or for the purpose of an activity improving effect.

Change in the mount of hydrogen to be used allows the molecular weight distribution, deviation of the molecular weight distribution to the higher molecular weight side, an extremely high molecular weight component, and a branch (quantity, length, and distribution) in addition to the average molecular weight of the generated polymer to be controlled. This allows the melt properties such as MFR, the branching index, the melt tension, and the extension property, which provide characteristics of the polypropylene having a long chain branching structure (A), to be controlled.

Here, hydrogen is preferably used in a molar ratio of $1.0 \times 10^{-6}$ or more, preferably $1.0 \times 10^{-5}$ or more, and further preferably $1.0 \times 10^{-4}$ or more. With respect to the upper limit, hydrogen is favorably used in a molar ratio of $1.0 \times 10^{-2}$ or less, preferably $0.9 \times 10^{-2}$ or less, and further preferably $0.8 \times 10^{-2}$ or less.

Polymerizing propylene using the catalyst and the polymerization method exemplified here results in generating what is called macromer that mainly represents a propenyl structure in one terminal of the polymer by particular chain transfer reaction generally referred to as β-methyl elimination from the active species derived from the catalyst component [M-1]. It is considered that this macromer can produce a product having higher molecular weight and is captured by the active spices derived from the catalyst component [M-2] having a better copolymerization property to promote macromer copolymerization. Therefore, a comb-shaped chain is the main structure as the branching structure of the generated polypropylene resin having a long chain branching structure.

The use of the metallocene-based catalyst allows the product to have the structure having high stereoregularity as described above.

Usable examples of a commercially available product as the propylene-based polymer having a long chain branching structure (A) that can be used in the present invention include various grades of WAYMAX (trade name) (manufactured by Japan Polypropylene Corporation), MFX8, MFX6, MFX3, EX8000, EX6000, ECX4000, and PF814 (trade name) (manufactured by LyondellBasell Industries N.V.), and Daploy (trade name) WB140HMS (manufactured by Borealis AG).

⟨Propylene-Based Polymer Having No Long Chain Branching Structure (B)⟩

The thermoplastic resin composition according to the present invention includes the propylene-based polymer having no long chain branching structure (B) as the component to be a base material used together with the propylene-based polymer having a long chain branching structure (A) described above.

In the present specification, the "propylene-based polymer having no long chain branching structure" or the "polypropylene having no long chain branching structure"

includes a linier propylene-based polymer or linier polypropylene, or a short chain branching linier propylene-based polymer or short chain branching linier polypropylene containing the short chain branch such as a methyl group derived from the monomer forming the main chain. More specifically, these polymers are the propylene-based polymer or polypropylene not corresponding to the "propylene-based polymer having a long chain branching structure" or the "polypropylene having a long chain branching structure".

Such a propylene-based polymer having no long chain branching structure (B) is not particularly limited as long as the propylene-based polymer having no long chain branching structure (B) is a propylene-based polymer corresponding to the above described definition. For example, the propylene-based polymer having no long chain branching structure (B) may be a polymer obtained by using a Ziegler-Natta catalyst or a magnesium chloride-supported Ziegler-Natta catalyst in the co-presence of a co-catalyst such as triethylaluminum or diethylaluminum to polymerize propylene or propylene and other α-olefin or a polymer obtained by polymerizing using a Kaminsky catalyst using a metallocene compound.

The stereoregularity of the propylene-based polymer having no long chain branching structure (B) is not particularly limited. An isotactic propylene-based polymer, a syndiotactic propylene-based polymer, an atactic propylene-based polymer, or a product obtained by mixing these propylene-based polymers in any ratio may be used. Although not particularly limited, from the viewpoint of easy industrial availability, polypropylene including a crystalline isotactic polymer as the main component and including about 0.5 mol % to about 2.0 mol % of an atactic polymer can be used.

However, as the thermoplastic resin composition according to the present invention, the propylene-based polymer having no long chain branching structure (B) desirably has a certain range of a flow property in order to obtain better formability, melt properties, and the like and thus desirably also has a melt flow rate (230° C.) measured in the same conditions as the conditions described above of 0.3 g/10 minutes to 50.0 g/10 minutes. The melt flow rate is more preferably 0.3 g/10 minutes to 10.0 g/10 minutes and further preferably 0.3 g/10 minutes to 1.0 g/10 minutes.

In the present invention, blend of the above-described propylene-based polymer having a long chain branching structure (A) results in improving, for example, the draw-down property and the extension property. Therefore, in order to prevent deterioration in flowability and processability of the thermoplastic resin composition, the propylene-based polymer having no long chain branching structure (B) desirably has a melt flow rate having a high value to some extent.

As the propylene-based polymer having no long chain branching structure (B), a propylene homopolymer is desirable. In this case, although not particularly limited, the propylene homopolymer desirably has an isotactic triad fraction (mm) measured by $^{13}$C-NMR of about 90% or more.

In the propylene-based polymer having no long chain branching structure (B), examples of α-olefin that can be copolymerized with propylene include ethylene, 1-butene, 1-pentene, 4-methyl-1-pentene, 1-octene, 1-decene, and 1-hexene. Of these α-olefins, ethylene, 1-butene, and 1-hexene are particularly preferable. The propylene-based polymer having no long chain branching structure (B) is not particularly limited and may be a propylene-based polymer containing constitutional units derived from the monomer other than propylene in a ratio of less than 15% by mass. The propylene-based polymer having no long chain branching structure (B), however, is preferably the homopolymer of propylene as described above.

⟨Blend Ratio of Propylene-Based Polymer Having No Long Chain Branch (B) and Propylene-Based Polymer Having a Long Chain Branching Structure (A)⟩

In the thermoplastic composition according to the present invention, the propylene-based polymer having no long chain branch (B) and the propylene-based polymer having a long chain branching structure (A) are included in a ratio of 80:20 to 98:2 in a mass ratio. The thermoplastic resin composition having the blend ratio in this range allows the thermoplastic composition including the inorganic filler and the thermoplastic resin according to the present invention to achieve improvement in strength at break and maximum elongation in the stress-strain curve (S-S curve) obtained in the tensile tests at 170° C. and 180° C. as described below compared with (1) the propylene-based polymer having no long chain branch (B) alone, (2) the thermoplastic composition including the propylene-based polymer having no long chain branch (B) and the inorganic filler, (3) and the propylene-based polymer blend including the polypropylene-based polymer having no long chain branch (B) and the propylene-based polymer having a long chain branching structure (A). Therefore, the thermoplastic resin composition provides a sheet not generating the feeding failure in a device having a heat setting process in the case where the thermoplastic resin composition is formed into the sheet even when the thermoplastic resin composition includes a large amount of the inorganic filler. In addition, the draw-down property and the extension property at the time of heat melting are excellent. The heat resistance and flame retardancy are also improved by including the polypropylene having a long chain branching structure (A) in a predetermined amount described above.

The mass ratio of the propylene-based polymer having no long chain branch (B) and the propylene-based polymer having a long chain branching structure (A) is preferably in a ratio of 80:20 to 98:2 and more preferably in a ratio of 80:20 to 90:10.

⟨Other Thermoplastic Resin⟩

In the thermoplastic resin composition according to the present invention, thermoplastic resins other than the propylene-based polymer having no long chain branch (B) and the propylene-based polymer having a long chain branching structure (A) may be included as the resin component as long as these other thermoplastic resins do not significantly impair the given effect provided by the propylene-based polymer having no long chain branch (B) and the propylene-based polymer having a long chain branching structure (A). In the case where the mass of the entire resin component is determined to be 100%, these other thermoplastic resins may be included in a ratio of about 0% by mass to about 30% by mass. In other words, in the case where the mass of the entire resin component in the thermoplastic resin composition is determined to be 100%, the total amount of the propylene-based polymer having no long chain branch (B) and the propylene-based polymer having a long chain branching structure (A) is desirably 70% by mass to 100% by mass. These other thermoplastic resins are not particularly limited. Examples of these other thermoplastic resins include a polyolefin resin except polypropylene (for example, polyethylene, a propylene-ethylene copolymer, and polybutylene), a biodegradable resin, a polyamide resin, polybutylene terephthalate (PBT), and polyethylene terephthalate (PET).

The polyolefin resin and the polyamide resin refer to resins having polyolefin and polyamide as the main chains, respectively. More specifically, for example, polyethylene refers to a resin having ethylene as the main chain. As these resins, the resins having a crystalline property are preferable and may be a copolymer with other monomers.

The biodegradable resin refers to a resin that is completely consumed by microorganisms in nature and finally degrades into water and carbon dioxide.

Specific examples include polylactic acid, polycaprolactone, polybutylene succinate, polybutylene adipate, polyethylene succinate, and cellulose ester. The crystalline macromolecules may be used singly or may be used in combination of two or more of them. For example, the crystalline macromolecule may be a mixture of polypropylene and polyethylene.

⟨Inorganic Filler⟩

The inorganic filler blended in the thermoplastic resin composition according to the present invention is not particularly limited. Examples of the inorganic filler include powder carbonate, sulfate, silicate, phosphate, borate, and oxide of calcium, magnesium, aluminum, titanium, iron, and zinc or hydrates thereof. Specific examples include calcium carbonate, magnesium carbonate, zinc oxide, titanium oxide, silica, alumina, clay, talc, kaolin, aluminum hydroxide, magnesium hydroxide, aluminum silicate, magnesium silicate, calcium silicate, aluminum sulfate, magnesium sulfate, calcium sulfate, magnesium phosphate, barium sulfate, silica sand, carbon black, zeolite, molybdenum, diatomaceous earth, sericite, shirasu, calcium sulfite, sodium sulfate, potassium titanate, bentonite, and graphite. These inorganic fillers may be synthetic products or products originated from minerals. These inorganic fillers may be used singly or in combination of two or more of them.

The shape of the inorganic filler is not particularly limited and may be any of a particle shape, a flake shape, a granule shape, and a fiber shape. The particle shape may be a spherical shape so as to be generally obtained by a synthesis method or an irregular shape so as to be obtained by grinding collected natural minerals.

As the inorganic filler, calcium carbonate, magnesium carbonate, zinc oxide, titanium oxide, silica, alumina, clay, talc, kaolin, aluminum hydroxide, magnesium hydroxide, and the like are preferable and calcium carbonate is particularly preferable. The calcium carbonate may be both of what is called light calcium carbonate prepared by a synthesis method and what is called heavy calcium carbonate obtained by mechanically grinding and classifying a natural raw materials including $CaCO_3$ as the main component such as limestone and the combination of these is also possible. From the viewpoint of economic efficiency, the heavy calcium carbonate is preferable.

In order to enhance the dispersibility or reactivity of the inorganic filler, the surface of the inorganic filler may be modified in accordance with the common methods. As the surface modification method, a method of physical treatment such as plasma treatment and a method of chemical treatment of the surface with a coupling agent or a surfactant can be exemplified. Examples of the coupling agent include a silane coupling agent and a titanium coupling agent. As the surfactant, any of an anionic surfactant, a cationic surfactant, a nonionic surfactant, and an amphoteric surfactant may be used. Examples of the surfactant include a higher fatty acid, a higher fatty acid ester, a higher fatty acid amide, and a higher fatty acid salt.

The inorganic filler is preferably particles. The average particle diameter is preferably 0.1 μm or more and 50.0 μm or less and more preferably 1.0 μm or more and 15.0 μm or less. The average particle diameter of the inorganic filler described in the present specification refers to a value calculated from the measurement result of the specific surface area based on the air permeation method in accordance with JIS M-8511. As the measurement apparatus, for example, a specific surface area measurement apparatus Type SS-100 manufactured by SHIMADZU CORPORATION is preferably used. In particular, the particles preferably do not contain particles having a particle diameter of 50.0 μm or more in the particle diameter distribution of the particles. On the other hand, excessively fine particles may significantly increase the viscosity when the particles are kneaded with the above-described thermoplastic resin and thus the production of the formed article may be difficult. Consequently, the average particle diameter of the particles is preferably 0.5 μm or more.

The average particle diameter of the inorganic filler having the powder shape, the flake shape, or the granule shape is preferably 10.0 μm or less and more preferably 5.0 μm or less.

The average fiber length of the inorganic filler having the fiber shape is preferably 3.0 lam or more and 20.0 μm or less. The average fiber diameter is preferably 0.2 μm or more and 1.5 μm or less. The aspect ratio is usually 10 or more and 30 or less. The average fiber length and the average fiber diameter of the inorganic filler having the fiber shape are measured by observation using an electron microscope and the aspect ratio is a ratio of the average fiber length to the average fiber diameter (Average fiber length/Average fiber diameter).

The heavy calcium carbonate included in the composition according to the present invention is not particularly limited as long as heavy calcium carbonate is used, and the surface treatment may be employed.

Here, heavy calcium carbonate is a product obtained by mechanically grinding and processing natural limestone or the like and is clearly distinguished from synthetic calcium carbonate produced by chemical precipitate reaction or the like. The grinding method includes a dry method and a wet method. From the viewpoint of economic efficiency, the dry method is preferable.

The average particle diameter of the heavy calcium carbonate is preferably 15.0 μm or less and more preferably 1.0 μm to 5.0 μm because the cured product of the composition according to the present invention has excellent tear strength.

The average particle diameter of the heavy calcium carbonate refers to a value calculated from the measurement result of the specific surface area based on the air permeation method in accordance with JIS M-8511. As the measurement apparatus, the specific surface area measurement apparatus Type SS-100 manufactured by SHIMADZU CORPORATION is preferably used.

The blend ratio of the thermoplastic resin and the inorganic filler (% by mass) included in the thermoplastic resin composition according to the present invention is not particularly limited as long as the ratio is 50:50 to 10:90. The ratio is preferably in a ratio of 40:60 to 20:80 and preferably in a ratio of 40:60 to 25:75. This is because, in the blend ratio of the thermoplastic resin and the inorganic filler, given texture and physical properties such as impact resistance of the thermoplastic resin composition provided by blending the inorganic filler are not obtained in the case where the ratio of the inorganic filler is less than 50% by mass, whereas forming process by, for example, extrusion forming is difficult in the case where the ratio of the inorganic filler is more than 90% by mass.

In the thermoplastic resin composition according to the present invention, the mass ratio (% by mass) of the propylene-based polymer having no long chain branch (B) and the propylene-based polymer having a long chain branching structure (A) excluding the inorganic filler is preferably in a ratio of 80:20 to 98:2. The ratio of 80:20 to 90:10 can be exemplified as a more preferable example.

⟨Other Additives⟩

To the thermoplastic resin composition according to the present invention, other additives can be blended as auxiliary agents, if necessary. As the other additives, for example, colorants, lubricating agents, coupling agents, flowability improvers, dispersing agents, antioxidants, ultraviolet ray absorbers, flame retardants, stabilizers, antistatic agents, foaming agents, and the like may be blended. These additives may be used singly or in combination of two or more of them. These additives may be blended at the kneading process described below or may be previously blended to the resin composition before the kneading process. In the thermoplastic resin composition according to the present invention, the amount of these other additives to be added is not particularly limited as long as the given effect by the blend of the thermoplastic resins including the polypropylene-based polymer having no long chain branch (B), the propylene-based polymer having a long chain branching structure (A), and the inorganic filler is not impaired. For example, each of these other additives is desirably blended in a ratio of about 0% by mass to about 5% by mass and the ratio of the entire other additives is desirably 2% by mass or less in the case where the mass of the entire thermoplastic resin composition is determined to be 100%.

Hereinafter, the additives considered to be important in these additives will be described with reference to examples. However, the additives are not limited to these additives.

As the colorants, any of the known organic pigments, inorganic pigments, or dyes may be used. Specific examples include organic pigments such as azo, anthraquinone, phthalocyanine, quinacridone, isoindolinone, geoosadine, perinone, quinophthalone, and perylene pigments and inorganic pigments such as ultramarine blue, titanium oxide, titanium yellow, iron oxide (red iron oxide), chromium oxide, zinc white, and carbon black.

Examples of the lubricating agents include fatty acid-based lubricating agents such as stearic acid, hydroxystearic acid, complex stearic acid, and oleic acid; aliphatic alcohol-based lubricating agents; aliphatic amide-based lubricating agents such as stearoamide, oxystearamide, oleylamide, erucylamide, ricinolamide, behenamide, methylolamide, methylenebisstearamide, methylenebisstearobehenamide, higher fatty acid bisamides, and complex amides; aliphatic ester-based lubricating agents such as n-butyl stearate, methyl hydroxystearate, polyhydric alcohol fatty acid esters, saturated fatty acid esters, and ester-based wax; and fatty acid metal soap-based lubricants.

As the antioxidants, phosphorous-based antioxidants, phenol-based antioxidants, and pentaerythritol-based antioxidants may be used. The phosphorous-based antioxidants, more specifically, phosphorous-based antioxidant stabilizer such as phosphite esters and phosphate esters are preferably used. Examples of the phosphites include triesters, diesters, and monoesters of phosphorous acid such as triphenyl phosphite, trisnonylphenyl phosphite, and tris(2,4-di-t-butylphenyl)phosphite.

Examples of the phosphate esters include trimethyl phosphate, triethyl phosphate, tributyl phosphate, trioctyl phosphate, triphenyl phosphate, tricresyl phosphate, tris(nonylphenyl) phosphate, and 2-ethylphenyl diphenyl phosphate. These phosphorous-based antioxidants may be used singly or in combination of two or more of them.

Examples of the phenol-based antioxidants include α-tocopherol, butylhydroxytoluene, sinapyl alcohol, vitamin E, n-octadecyl-3-(3,5-di-t-butyl-4-hydroxyphenyl) propionate, 2-t-butyl-6-(3'-t-butyl-5'-methyl-2'-hydroxybenzyl)-4-methylphenyl acrylate, 2,6-di-t-butyl-4-(N,N-dimethylaminomethyl)phenol, 3,5-di-t-butyl-4-hydroxybenzylphosphonate diethyl ester, and tetrakis[3-(3,5-di-t-butyl-4-hydroxyphenyl)propionyloxymethyl]methane. These phenol-based antioxidants may be used singly or in combination of two or more of them.

The flame retardant is not particularly limited. For example, a halogen-based flame retardant or a non-halogen-based flame retardant such as a phosphorus-based flame retardant and a metal hydrate may be used. Specific examples of the halogen-based flame retardant include a halogenated bisphenol-based compound such as a halogenated bisphenylalkane, a halogenated bisphenyl ether, a halogenated bisphenyl thioether, and a halogenated bisphenyl sulfone and a bisphenol-bis(alkylether)-based compound such as brominated bisphenol A, brominated bisphenol S, chlorinated bisphenol A, and chlorinated bisphenol S. Specific examples of the phosphorus-based flame retardant include tris(diethylphosphinic acid)aluminum, bisphenol-A-bis-(diphenylphosphate), tri(isopropylated aryl) phosphates, cresyl-di-2,6-xylenyl phosphate, and an aromatic condensed phosphate. Specific examples of the metal hydrate include aluminum trihydrate, magnesium dihydroxide, and combination thereof. These flame retardants may be used singly or in combination of two or more of them. These compounds act as flame retardant auxiliaries and can more efficiently improve the flame retardant effect. In addition, for example, antimony oxide such as antimony trioxide and antimony pentoxide, zinc oxide, iron oxide, aluminum oxide, molybdenum oxide, titanium oxide, calcium oxide, magnesium oxide, or the like can be used together as a flame retardant auxiliary.

The foaming agent is mixed or injected with pressure in the thermoplastic resin composition serving as the raw material in a melted state in a melting kneader and is a substance that causes phase change from solid to gas or liquid to gas or a substance that is gas itself. The foaming agent is mainly used for controlling the foaming ratio (foam density) of the foam sheet. As the foaming agent dissolved in the thermoplastic resin composition serving as the raw material, the phase of a foaming agent that is liquid at normal temperature is changed into gas to dissolve in the melted resin and the phase of a foaming agent that is gas at normal temperature is not changed and the foaming agent is dissolved in the melted resin as it is. The foaming agent dispersed and dissolved in the melted resin expands inside a sheet at the time of extruding the melted resin from an extrusion die in a sheet-like form because the pressure is released and thus many fine closed cells are formed in the sheet to provide a foam sheet. The foaming agent acts as a plasticizer as a side effect that reduces the melt viscosity of the raw material resin composition and lowers the temperature for making the raw material resin composition in a plasticized state.

Examples of the foaming agent include aliphatic hydrocarbons such as propane, butane, pentane, hexane, and heptane; alicyclic hydrocarbons such as cyclobutane, cyclopentane, and cyclohexane; halogenated hydrocarbons such as chlorodifluoromethane, difluoromethane, trifluoromethane, trichlorofluoromethane, dichloromethane, dichlorofluoromethane, dichlorodifluoromethane, chloromethane, chloroethane, dichlorotrifluoroethane, dichloropentafluoroethane, tetrafluoroethane, difluoroethane, pentafluoroethane, trifluoroethane, dichlorotetrafluoroethane, trichlorotrifluoroethane, tetrachlorodifluoroethane, and perfluorocyclobutane; inorganic gas such as carbon dioxide, nitrogen, and air; and water.

As the foaming agent, for example, a compound in which the active component of the foaming agent is contained in a carrier resin is also preferably used. Examples of the carrier resin include a crystalline polyolefin resin. Of these carrier resins, crystalline polypropylene resin is preferable. As the active component, hydrogen carbonate salts and the like are exemplified. Of these compounds, the hydrogen carbonate salts are preferable. The compound is preferably a foaming agent concentrate including the crystalline polypropylene resin as the carrier resin and the hydrogen carbonate salt as the thermally decomposable foaming agent.

The content of the foaming agent included in the foaming agent in the forming process can be appropriately determined depending on the kinds of the thermoplastic resin and inorganic filler, and a quantity of the active component. The content is preferably determined to be in the range of 0.04% by mass to 5.00% by mass relative to the total mass of the thermoplastic resin composition.

In the aspect in which the thermoplastic resin composition according to the present invention includes the foaming agent, the mass ratio (% by mass) of two components of the propylene-based polymer having no long chain branch (B) and the propylene-based polymer having a long chain branching structure (A) except the inorganic filler and the foaming agent is more preferably in a ratio of 80:20 to 98:2 and the ratio of 80:20 to 90:10 can be exemplified as a preferable example.

Examples of the commercially available product of the foaming agent include POLYTHLENE EE275F manufactured by EIWA CHEMICAL IND. CO., LTD.

<Method for Producing Thermoplastic Resin Composition>

In the method for producing the thermoplastic resin composition according to the present invention, common methods can be used. The method may be appropriately determined depending on the forming method (for example, extrusion forming, injunction forming, and a vacuum forming). For example, the thermoplastic resin and the inorganic filler may be kneaded and melted before the materials are fed from a hopper to a forming machine or the thermoplastic resin and the inorganic filler may be integrally and simultaneously kneaded and melted with forming using a forming machine. The kneading and melting are preferably carried out by applying high shear stress to the kneading while the inorganic filler is being uniformly dispersed in the thermoplastic resin and preferably carried out using a twin screw kneader to knead.

In the method for producing the thermoplastic resin composition according to the present invention, the thermoplastic resin composition may be in the form of pellets or may be different from the form of pellets. In the case where the thermoplastic resin composition is in the form of pellets, the shape of the pellets is not particularly limited. For example, pellets having a cylindrical shape, a spherical shape, an elliptical sphere shape, or the like may be formed.

The size of the pellets may be appropriately determined depending on the form. For example, in the case of the spherical pellets, the diameter may be 1 mm to 10 mm. In the case of the elliptical sphere shape pellets, the pellets may be an elliptical sphere shape having a ratio of a longitudinal length and a transverse length of 0.1 to 1.0 and a longitudinal and transverse size of 1 mm to 10 mm. In the case of cylindrical pellets, the pellets may have a diameter in the range of 1 mm to 10 mm and a length in the range of 1 mm to 10 mm. These shapes may be formed to the pellets after the kneading process described below. The shape of the pellets may be formed in accordance with the common methods.

⟨Formed Article⟩

The formed article according to the present invention is a formed article formed by using the thermoplastic resin composition.

The shape and the like of the formed article according to the present invention are not particularly limited. The shape may be various forms and the formed article may be formed as a sheet, a container body, or the like.

In particular, in the case where the form of the formed article is a sheet, the sheet can achieve the particularly excellent properties in which, for example, the feeding failure in a device having a heat setting process such as a laser printer is not generated even when the thermoplastic resin composition includes a large amount of the inorganic filler.

The thermoplastic resin composition according to the present invention has the excellent drawdown property and extension property at heat melting even when a large amount of the inorganic filler is included. Therefore, the formed article according to the present invention has a desired shape not depending on the shape of the formed article and has uniform quality in each part because the thermoplastic resin composition can form the shape due to its followability even when the forming mold has, for example, deep drawing or the like.

The thermoplastic resin composition includes the inorganic filler and, in addition, includes the propylene-based polymer having a long chain branching structure (A) in a predetermined amount, whereby the thermoplastic resin composition has excellent heat resistance and flame retardancy.

Specifically, with regard to the flame retardancy, the formed article can satisfy, for example, UL94 V-1 or more, in particular, UL94 V-0 in UL94 standard defined by Underwriters Laboratories Inc. even when the formed article has the aspect of the foaming body. Furthermore, the formed article can satisfy UL94 5V, which is higher flame retardancy performance, by blending adequate flame retardant.

With regard to the heat resistance, strength at break and maximum elongation in the stress-strain curve (S-S curve) obtained in the tensile tests at 170° C. and 180° C. are highly improved and this improvement prevents heat deformation causing the problem of feeding property of the sheet in the device having a heat setting process such as a laser printer as described above.

The thickness of the formed article according to the present invention is not particularly limited and may be various thickness from a thin thickness to a thick thickness depending on the form of the formed article. For example, the formed article preferably having a thickness of 40 μm or more and 1,000 μm or less and more preferably having a thickness of 50 μm or more and 700 μm or less is exhibited. The formed article having the thickness within the range allows the formed article having no problems of formability and processability, not causing uneven thickness, being uniform, and having no defect to be formed.

In particular, in the case where the form of the formed article is a sheet, the thickness of the sheet is desirably more preferably 50 μm or more and 400 μm or less and further preferably 50 μm or more and 300 μm or less. The sheet having the thickness within such a range can be suitably used instead of paper or synthetic paper for the application of general printing and information and packaging. This sheet can achieve the particularly excellent properties in which, for example, the feeding failure in a device having a heat setting process such as a laser printer is not generated even when a large amount of the inorganic filler is included.

(Method for Producing Formed Article)

The method for producing the formed article according to the present invention is not particularly limited as long as the formed article can be formed in a desired shape. The formed article can be formed and processed in any conventionally known methods such as extrusion forming, injection forming, vacuum forming, blow forming, and calendar forming. Furthermore, in the case where the thermoplastic resin composition according to the present invention includes the foaming agent and the formed article of an aspect serving as the foaming body is obtained, for example, both liquid phase forming methods such as injection forming, extrusion foaming, and blow foaming or solid phase foaming such as bead foaming, batch foaming, press foaming, and secondary foaming under normal pressure may be used. As described above, in one aspect of the thermoplastic composition in which the crystalline polypropylene as the carrier resin and the hydrogen carbonate salt as the thermally decomposable foaming agent are included, the injection foaming method and the extrusion foaming method can be desirably used.

The forming temperature at forming cannot be simply determined because the temperature varies to a certain extent depending on the forming method. For example, the forming article formed at a temperature of 180° C. to 260° C. and more preferably 190° C. to 230° C. allows the thermoplastic composition according to the present invention to have the excellent drawdown property and extension property and the formed article having the predetermined shape to be formed without locally generating degeneration of the composition.

<Method for Producing Sheet>

In the aspect in which the formed article according to the present invention is a sheet, the method for producing the sheet is not particularly limited as long as the method is a method for forming the thermoplastic resin composition to a sheet-like product and the conventionally known forming method as described above can be used. In particular, considering the smoothness of the sheet surface, the method for producing the sheet by extrusion forming using an extruder is preferably employed. Mixing of the fine inorganic filler is also useful for improving whiteness.

As the forming, a direct method in which a kneading process and a forming process to the sheet-like product are continuously carried out may be used or a method for using a twin screw extrusion forming machine with a T die system may be used.

In the case of forming the sheet-like product, the sheet-like product can be stretched in a uniaxial direction, biaxial directions, or multi-axial directions (For example, stretching by a tubular method) at the forming or after the forming of the sheet-like product. In the case of the biaxial stretching, the stretching may be sequential biaxial stretching or simultaneously biaxial stretching.

Stretching the sheet after forming (for example, longitudinal stretching and/or transverse stretching) results in decreasing the density of the sheet. The decrease in the density allows the whiteness of the sheet to be excellent.

EXAMPLE

Hereinafter, the present invention will be specifically described with reference to Examples. Examples are described only for the purpose of exemplifying the specific aspects and embodiments in order to more facilitate the understanding of the concept and scope of the present invention disclosed in the present specification and described in the attached CLAIMS and the present invention is not limited thereto at all.

(Evaluation Methods)

Each physical property in Examples and Comparative Examples described below was evaluated in accordance with the following methods.

Melt Flow Rate (MFR):

The melt flow rates of the propylene-based polymer having a long chain branching structure (A) and the propylene-based polymer having no long chain branching structure (B) were measured in accordance with HS K7210-1: 2014 Method A and Condition M at a test temperature of 230° C., a nominal load of 2.16 kg, a die form having a diameter of 2.095 mm and a length of 8.00 mm.

Melt Tension:

Melt tension was measured using Capillograph manufactured by Toyo Seiki Seisaku-sho, Ltd. under the following conditions.

Capillary: Diameter 2.0 mm and length 40 mm
Cylinder diameter: 9.55 mm
Cylinder extrusion rate: 20 mm/minute
Draw rate: 4.0 m/minute Isotactic Triad Fraction (mm)

Into a NMR sample tube having an inner diameter of 10 mm, 390 mg of the sample was placed together with 2.6 ml of o-dichlorobenzene/deuterated benzene bromide ($C_6D_5Br$) =4/1 (volume ratio) and hexamethyldisiloxane as a reference substance for chemical shift and dissolved to carry out $^{13}C$-NMR measurement. $^{13}C$-NMR was measured using AV400M type NMR apparatus equipped with a cryoprobe having a diameter of 10 mm manufactured by Bruker BioSpin Corporation.

Pulse angle: 90°
Pulse interval: 15 seconds
Accumulated count: 128 times or more
Observation range: −20 ppm to 179 ppm The chemical shift of the peak of the methyl carbon in hexamethyldisiloxane was determined to be 1.98 ppm and this chemical shift was used as a reference to the chemical shifts of peaks according to other carbons.

Branching Index g'
[Measurement Method]

GPC: Alliance GPC/V 2000 (manufactured by Waters Corporation) Detectors: Listed in order of connection Multi-angle laser light scattering detector (MALLS): DAWN-E (manufactured by Wyatt Technology Corporation)

Differential refractometer (RI): Attached in GPC
Viscosity detector (Viscometer): Attached in GPC
Mobile phase solvent: 1,2,4-trichlorobenzene (added in a concentration of 0.5 mg/mL)
Mobile phase flow rate: 1 mL/minute
Column: Connecting two GMHHR-H(S) HTs (manufactured by TOSOH CORPORATION)
Temperature at sample injection part: 140° C.
Column temperature: 140° C.

Detector temperature: 140° C. for all detectors
Sample concentration: 1 mg/mL
Injected amount (sample loop capacity): 0.2175 mL
[Analysis Method]

For determining the absolute molecular weight (Mabs) obtained from the multi-angle laser light scattering detector (MALLS), a square mean radius of inertia (Rg), and an intrinsic viscosity ([η]) obtained from Viscometer, data processing software ASTRA (version 4. 73. 04) attached in MALLS was used.

Tensile Tests:

The tensile tests of the extrusion-formed sheet were carried out using Compact Material Tester for Tensile and Compression IMF-90F6 manufactured by Imoto Machinery Co., LTD at 170° C. and 180° C. As the shape of the test specimen, the dumbbell-like Type No. 7 in JIS K6251: 2010 was used. The stretching speed was 10 mm/minute.

The tensile strength, the tensile modulus, and the elongation ratio were measured from the obtained stress-strain curve.

(Material)

The components used in Examples and Comparative Examples described below were as follows.

Polypropylene Having No Long Chain Branch (B):

The polypropylene having no long chain branch (B) used was as follows.

B1: Polypropylene homopolymer (manufactured by Japan Polypropylene Corporation: NOVATEC (trade name) PP EA9)
MFR (JIS K7210-1: 2014, 230° C.): 0.5 g/minute
B2: Polypropylene homopolymer (manufactured by Japan Polypropylene Corporation: NOVATEC (trade name) PP FY6C)
MFR (JIS K7210-1: 2014, 230° C.): 2.4 g/minute
B3: Polypropylene homopolymer (manufactured by Japan Polypropylene Corporation: NOVATEC (trade name) PP MA1B)
MFR (JIS K7210-1: 2014, 230° C.): 21.0 g/minute
B4: Polypropylene homopolymer (manufactured by Japan Polypropylene Corporation: NOVATEC (trade name) PP BC06C)
MFR (JIS K7210-1: 2014, 230° C.): 60.0 g/minute Polypropylene Having a Long Chain Branch (A):

The polypropylene having a long chain branch (A) used was as follows.

A1: Metallocene-based long chain branching polypropylene (manufactured by Japan Polypropylene Corporation: WAYMAX (trade name) MFX 8)
MFR (JIS K7210-1: 2014, 230° C.): 1.1 g/minute
Melt tension (230° C.): 25 g
Isotactic triad fraction (mm): 90% or more
Branching index g': 0.30 or more and less than 1.00
A2: Metallocene-based long chain branching polypropylene (manufactured by Japan Polypropylene Corporation: WAYMAX (trade name) MFX 6)
MFR (JIS K7210-1: 2014, 230° C.): 2.5 g/minute
Melt tension (230° C.): 17 g
Isotactic triad fraction (mm): 90% or more
Branching index g': 0.30 or more and less than 1.00
A3: Metallocene-based long chain branching polypropylene (manufactured by Japan Polypropylene Corporation: WAYMAX (trade name) MFX 3)
MFR (JIS K7210-1: 2014, 230° C.): 9.0 g/minute
Melt tension (230° C.): 5 g
Isotactic triad fraction (mm): 90% or more
Branching index g': 0.30 or more and less than 1.00
A4: Metallocene-based long chain branching polypropylene
MFR (JIS K7210-1: 2014, 230° C.): 12.0 g/minute
Melt tension (230° C.): 3 g
Isotactic triad fraction (mm): 90% or more
Branching index g': 0.30 or more and less than 1.00

Other Resins (Z):

Z1: Ultra high molecular weight polyethylene (manufactured by Mitsui Chemicals, Inc., LUBMER (registered trademark) L3000)
Z2: Polymethylpentene (manufactured by Mitsui Chemicals, Inc., TPX (registered trademark) DX845)

Inorganic Filler (C):

C1: Surface-treated heavy calcium carbonate particles with fatty acid, average particle diameter: 2.2 µm (manufactured by BIHOKU FUNKA KOGYO CO., LTD., LIGHTON S-4)
C2: Light calcium carbonate particles, average particle diameter: 1.5 µm (manufactured by SHIRAISHI CALCIUM KAISHA, LTD., PC)

Lubricating Agent (D):

D1: Magnesium stearate

Foaming Agent (E):

POLYTHLENE EE275F, manufactured by EIWA CHEMICAL IND. CO., LTD.

Example 1

B1 as the polypropylene having no long chain branch (B), A1 as the polypropylene having a long chain branching structure (A), C1 as the inorganic filler, and D1 as the lubricating agent were used in a blend ratio listed in Table 1. The value of each component is a value of part by mass. Each of the components was kneaded for 15 minutes using 75 liter 3D Banbury mixer manufactured by Kobe Steel, Ltd. The discharged resin temperature was 180° C.

Thereafter, the resultant thermoplastic resin composition passed through a strainer being 150 mm and having an L/D of 10 manufactured by Katsu Manufacturing Co., Ltd. and the strand was extruded from a die at 210° C., cooled with water, and cut to form pellets. The sheet of thus prepared pellets was extruded from a T die at 210° C. using LABO PLASTOMILL single screw T die extrusion forming apparatus (diameter 20 mm and L/D=25) manufactured by Toyo Seiki Seisaku-sho, Ltd. and wound by a film and sheet winder FT3W20 manufactured by Toyo Seiki Seisaku-sho, Ltd. The measured thickness of thus obtained sheet was 200 µm. The thickness had substantially no deviation at the measured parts and thus the entire sheet had uniform thickness.

Figure 2:
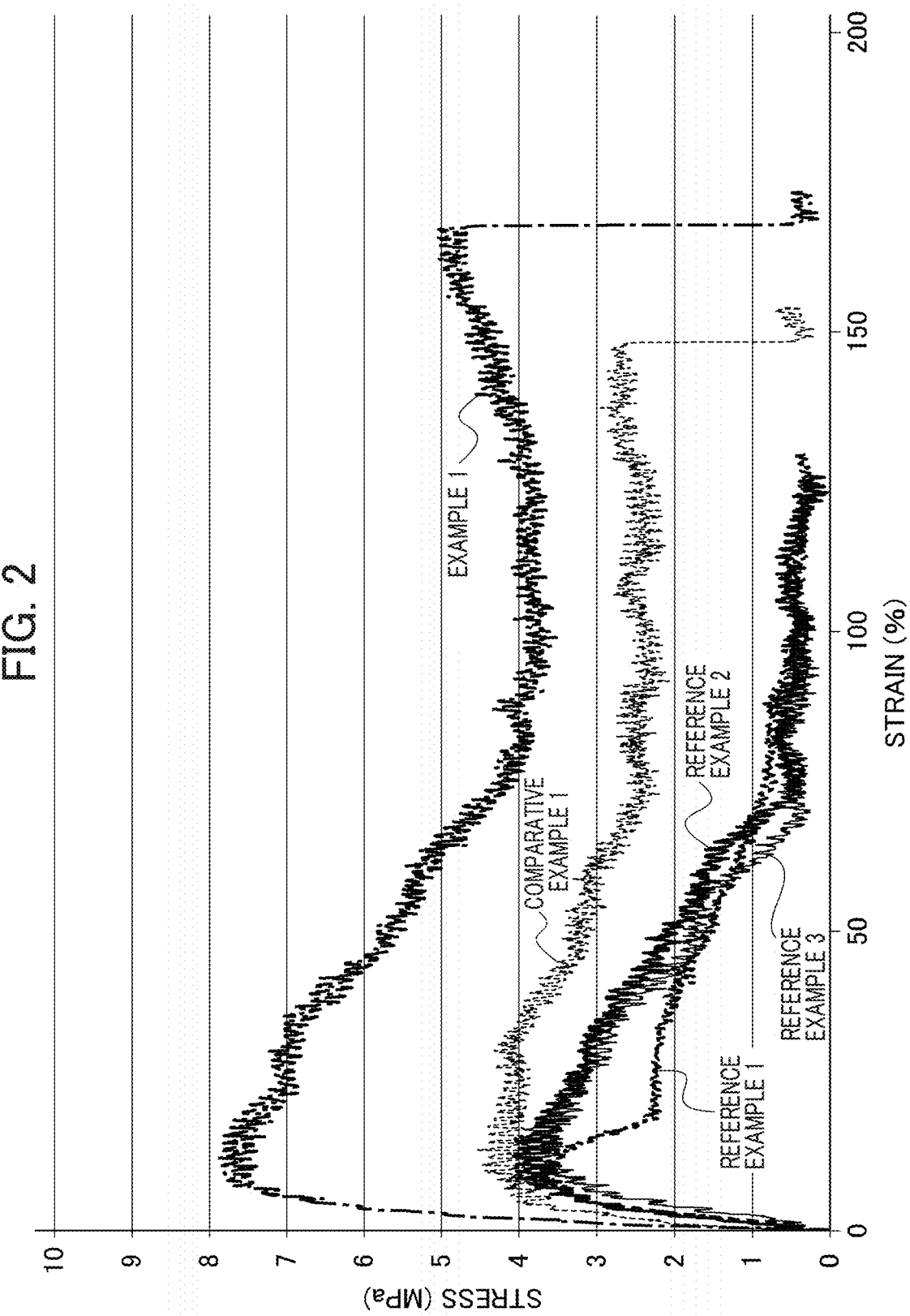
FIG. 2 is a graph illustrating test results at 180° C. exhibiting the effect of the present invention.

The inventors of present invention have found that the feeding property that is the problem to be solved of the present invention has strong correlation with the improvement in the stretchability in the tensile tests at 170° C. and 180° C. and the effect of the present invention was evaluated by the result of the tensile tests. The test specimen was prepared under the above-described conditions to carry out the tensile tests. The obtained results are listed in Table 2. In FIG. 1 and FIG. 2, the stress-strain curves of Example obtained by the tensile tests at respective temperatures are illustrated together with the values of Comparative Example 1 and Reference Examples 1 to 3 described below.

Examples 2 to 20, Comparative Examples 1 to 3, and Reference Examples 1 to 5

The sheets having a thickness of 200 µm were prepared by the same method as the method in Example 1 except that types and amounts of each of the components in the thermoplastic resin compositions were changed as listed in Table 1. Examples 12 and 13 had compositions including the foaming agent. The sheets extruded from the T die extrusion forming apparatus under the same conditions as the conditions in Example 1 were extruded in a state of uniform foaming.

The tensile tests at 170° C. and 180° C. were similarly carried out for thus obtained sheets. The obtained results are listed in Table 2. The lubricating agent was not blended in Example 2 and thus the sheet obtained in Example 2 generated extremely slight roughness on the surface of the extruded sheet. However, the sheet itself did not have practical problems and exhibited the same performance as in Example 1.

TABLE 1

| | Type/part by mass | | | | | |
|---|---|---|---|---|---|---|
| | PP having no long chain branch (B) | PP having long chain branching structure (A) | Other resin (Z) | Inorganic filler (C) | Lubricating agent (D) | Foaming agent (E) |
| Example 1 | B1/37 | A1/3 | | C1/60 | 0.5 | |
| Reference Example 1 | B1/100 | | | | 0.5 | |
| Reference Example 2 | B1/95 | A1/5 | | | 0.5 | |
| Reference Example 3 | B1/90 | A2/10 | | | 0.5 | |
| Comparative Example 1 | B1/40 | | | C1/60 | 0.5 | |
| Example 2 | B1/37 | A1/3 | | C1/60 | | |
| Reference Example 4 | B1/39.5 | A1/0.5 | | C1/60 | 0.5 | |
| Example 3 | B1/39 | A1/1 | | C1/60 | 0.5 | |
| Example 4 | B1/35 | A1/5 | | C1/60 | 0.5 | |
| Example 5 | B1/33 | A1/7 | | C1/60 | 0.5 | |
| Example 6 | B1/30 | A1/10 | | C1/60 | 0.5 | |
| Reference Example 5 | B1/28 | A1/12 | | C1/60 | 0.5 | |
| Comparative Example 2 | B1/37 | | Z1/3 | C1/60 | 0.5 | |
| Comparative Example 3 | B1/37 | | Z2/3 | C1/60 | 0.5 | |
| Example 7 | B1/50 | A1/4 | | C1/46 | 0.5 | |
| Example 8 | B1/46.25 | A1/3.75 | | C1/50 | 0.5 | |
| Example 9 | B1/27.75 | A1/2.25 | | C1/70 | 0.5 | |
| Example 10 | B1/9.25 | A1/0.75 | | C1/90 | 0.5 | |
| Example 11 | B1/7.4 | A1/0.6 | | C1/92 | 0.5 | |
| Example 12 | B1/37 | A1/3 | | C1/60 | 0.5 | 0.5 |
| Example 13 | B1/37 | A1/3 | | C1/60 | 0.5 | 2 |
| Example 14 | B1/37 | A2/3 | | C1/60 | 0.5 | |
| Example 15 | B1/37 | A3/3 | | C1/60 | 0.5 | |
| Example 16 | B1/37 | A4/3 | | C1/60 | 0.5 | |
| Example 17 | B2/37 | A1/3 | | C1/60 | 0.5 | |
| Example 18 | B3/37 | A1/3 | | C1/60 | 0.5 | |
| Example 19 | B4/37 | A1/3 | | C1/60 | 0.5 | |
| Example 20 | B4/37 | A1/3 | | C2/60 | 0.5 | |

TABLE 2

| | Strength at break (170° C.) MPa | Maximum elongation (170° C.) (%) | Strength at break (180° C.) MPa | Maximum elongation (180° C.) (%) | Remarks |
|---|---|---|---|---|---|
| Example 1 | 7.11 | 234 | 4.75 | 171 | |
| Reference Example 1 | 0.22 | 128 | 0.21 | 131 | |
| Reference Example 2 | 2.46 | 270 | 0.20 | 128 | |
| Reference Example 3 | 2.31 | 281 | 0.20 | 125 | |
| Comparative Example 1 | 3.94 | 265 | 2.75 | 148 | |
| Example 2 | 6.88 | 223 | 4.65 | 170 | |
| Reference Example 4 | 3.98 | 262 | 2.77 | 150 | |
| Example 3 | 5.21 | 234 | 4.77 | 175 | |
| Example 4 | 6.31 | 234 | 4.05 | 168 | |
| Example 5 | 6.21 | 231 | 3.20 | 171 | |
| Example 6 | 6.82 | 226 | 3.86 | 162 | |
| Reference Example 5 | 4.01 | 259 | 2.80 | 155 | |
| Comparative Example 2 | 2.12 | 201 | Unmeasurable | Unmeasurable | Unmeasurable due to melting at 180° C. |
| Comparative Example 3 | 2.96 | 212 | 2.35 | 123 | |
| Example 7 | 7.10 | 230 | 4.74 | 169 | |
| Example 8 | 6.54 | 156 | 3.64 | 145 | |
| Example 9 | 5.68 | 147 | 3.73 | 136 | |
| Example 10 | 5.53 | 140 | 3.62 | 133 | |
| Example 11 | 5.01 | 129 | 3.49 | 128 | |
| Example 12 | 6.93 | 229 | 4.52 | 164 | |
| Example 13 | 6.63 | 220 | 4.39 | 155 | |
| Example 14 | 6.83 | 234 | 4.45 | 174 | |
| Example 15 | 6.73 | 230 | 4.35 | 160 | |
| Example 16 | 6.52 | 225 | 4.30 | 153 | |
| Example 17 | 7.05 | 224 | 4.70 | 161 | |

TABLE 2-continued

|  | Strength at break (170° C.) MPa | Maximum elongation (170° C.) (%) | Strength at break (180° C.) MPa | Maximum elongation (180° C.) (%) | Remarks |
|---|---|---|---|---|---|
| Example 18 | 7.10 | 230 | 4.72 | 168 |  |
| Example 19 | 6.23 | 196 | 4.51 | 154 |  |
| Example 20 | 6.35 | 203 | 4.62 | 162 |  |

It is found that the group of the thermoplastic resin compositions including the inorganic filler of Examples exhibits the effect beyond the expected value of the group of the thermoplastic resin compositions including the propylene-based polymer having no long chain branching structure (B) by including the propylene-based polymer having a long chain branching structure (A). In particular, the tensile test at 180° C. exhibits a remarkable effect.

Example 21

The thermoplastic resin composition having the same composition as the composition of the thermoplastic resin composition prepared in Example 1 was subjected to the same kneading process, strand extrusion process, and cutting process to produce the pellets. Injection forming was carried out for the produced pellets using a small electrically-operated injection forming machine having a screw diameter of 16 mm (mold clamping pressure 18 tf) under the following injection forming conditions to form a container body having a thickness of 500 μm and including a recessed part having a depth of 2 mm, a longitudinal width of 40 mm, and a transversal width of 20 mm.

Forming temperature: 210° C.
Mold temperature: 47° C. to 49° C.
Injection pressure: 117 to 122 mPa
Injection speed: 20 mm/second
Holding pressure: 145 MPa
Screw revolution: 250 rpm The injection forming operation was capable of being stably operated without any problems. The formed article having no flow mark, no uneven thickness in the formed article, and excellent quality was capable of being formed.

The invention claimed is:

1. A thermoplastic resin composition comprising:
   at least a thermoplastic resin; and an inorganic filler,
   the thermoplastic resin comprising polypropylene having no long chain branch (B) and polypropylene having a long chain branching structure (A) in a mass ratio of 80:20 to 98:2,
   wherein a blend ratio of the thermoplastic resin to the inorganic filler in the thermoplastic resin composition is 50:50 to 10:90 in a mass ratio.

2. The thermoplastic resin composition according to claim 1, wherein
   the polypropylene having a long chain branching structure (A) has a long chain branching structure in which an isotactic triad fraction (mm) measured by $^{13}$C-NMR is 90% or more.

3. The thermoplastic resin composition according to claim 1, wherein
   the polypropylene having a long chain branching structure (A) is propylene having a long chain branching structure having a melt flow rate (230° C.) of 1.0 g/10 minutes to 3.0 g/10 minutes and a melt tension (230° C.) of 5 g to 30 g.

4. The thermoplastic resin composition according to claim 1, wherein
   the polypropylene having no long chain branching structure (B) is polypropylene having a melt flow rate (230° C.) of 0.3 g/10 minutes to 50 g/10 minutes.

5. The thermoplastic resin composition according to claim 1, wherein
   the inorganic filler has an average particle diameter of 0.1 μm or more and 50.0 μm or less.

6. A thermoplastic resin composition comprising:
   at least a thermoplastic resin; and an inorganic filler,
   the thermoplastic resin comprising polypropylene having no long chain branch (B) and polypropylene having a long chain branching structure (A) in a mass ratio of 80:20 to 98:2,
   wherein the inorganic filler is heavy calcium carbonate.

7. A thermoplastic resin composition comprising:
   at least a thermoplastic resin; and an inorganic filler,
   the thermoplastic resin comprising polypropylene having no long chain branch (B) and polypropylene having a long chain branching structure (A) in a mass ratio of 80:20 to 98:2,
   wherein a blend ratio of the thermoplastic resin to the inorganic filler in the thermoplastic resin composition is 50:50 to 10:90 in a mass ratio, and
   wherein the thermoplastic composition further comprises a foaming agent.

8. A formed article made of the thermoplastic composition comprising:
   at least a thermoplastic resin; and an inorganic filler,
   the thermoplastic resin comprising polypropylene having no long chain branch (B) and polypropylene having a long chain branching structure (A) in a mass ratio of 80:20 to 98:2,
   wherein a blend ratio of the thermoplastic resin to the inorganic filler in the thermoplastic resin composition is 50:50 to 10:90 in a mass ratio, and
   wherein the formed article is a foam body.

9. A formed article made of the thermoplastic composition comprising:
   at least a thermoplastic resin; and an inorganic filler,
   the thermoplastic resin comprising polypropylene having no long chain branch (B) and polypropylene having a long chain branching structure (A) in a mass ratio of 80:20 to 98:2,
   wherein a blend ratio of the thermoplastic resin to the inorganic filler in the thermoplastic resin composition is 50:50 to 10:90 in a mass ratio, and
   wherein the formed article is a foam sheet.

10. The formed article according to claim 8, wherein the formed article has a thickness of 50 μm or more and 700 μm or less.

11. The formed article according to claim 8, wherein the formed article is a sheet.

12. The formed article according to claim 8, wherein the formed article is a container body.

\* \* \* \* \*